(12) United States Patent
Ogino

(10) Patent No.: US 11,099,795 B2
(45) Date of Patent: Aug. 24, 2021

(54) IMAGE FORMING APPARATUS, CONTROL METHOD, AND SYSTEM

(71) Applicant: SHARP KABUSHIKI KAISHA, Sakai (JP)

(72) Inventor: Sintarou Ogino, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/878,276

(22) Filed: May 19, 2020

(65) Prior Publication Data

US 2020/0371728 A1 Nov. 26, 2020

(30) Foreign Application Priority Data

May 20, 2019 (JP) .............................. JP2019-094706

(51) Int. Cl.
*G06F 3/12* (2006.01)
*H04N 1/00* (2006.01)
*G06K 15/02* (2006.01)

(52) U.S. Cl.
CPC .......... *G06F 3/1224* (2013.01); *G06F 3/1293* (2013.01); *H04N 1/00244* (2013.01)

(58) Field of Classification Search
None
See application file for complete search history.

(56) References Cited

U.S. PATENT DOCUMENTS

| 10,572,195 | B2* | 2/2020 | Tan | H04N 1/00233 |
|---|---|---|---|---|
| 2005/0162685 | A1* | 7/2005 | Heiles | G06F 3/1206 358/1.15 |
| 2009/0037513 | A1* | 2/2009 | Yoda | H04N 1/00214 709/201 |
| 2012/0262754 | A1* | 10/2012 | Hwang | H04N 1/00228 358/1.15 |
| 2014/0036309 | A1* | 2/2014 | Oguma | G06F 3/1288 358/1.15 |
| 2014/0055804 | A1* | 2/2014 | Eguchi | G06F 3/1238 358/1.14 |
| 2014/0055814 | A1* | 2/2014 | Eguchi | G06F 3/1207 358/1.15 |
| 2014/0157149 | A1* | 6/2014 | Nishizawa | H04N 21/4882 715/752 |
| 2015/0172505 | A1* | 6/2015 | Park | H04N 1/00307 358/1.15 |

(Continued)

FOREIGN PATENT DOCUMENTS

JP 2015-138400 A 7/2015

*Primary Examiner* — Beniyam Menberu
(74) *Attorney, Agent, or Firm* — ScienBiziP, P.C.

(57) ABSTRACT

The present invention provides an image forming apparatus that is included in a system with a server that provides messages posted from a plurality of apparatuses to each of the plurality of apparatuses sequentially, and having an image forming device to form an image on a basis of output data. The image forming apparatus includes a message acquisition device that acquires a message provided by the server, a message determination device that determines a type of the acquired message, a message generator that generates the message on a basis of a status of the image forming apparatus in a case where the type of the message acquired is an output request, and a message posting device that posts the generated message to the server.

8 Claims, 32 Drawing Sheets

(56) References Cited

U.S. PATENT DOCUMENTS

2015/0317104 A1* 11/2015 Takenouchi .......... H04L 67/025
358/1.15
2016/0342370 A1* 11/2016 Yasuda .............. H04N 1/00307
2018/0084142 A1* 3/2018 Kamoi ............... H04N 1/32122
2020/0099799 A1* 3/2020 Obayashi ................ H04L 51/18

* cited by examiner

FIG. 3

| GROUP ID | BELONGING ACCOUNT |
|---|---|
| G001 | USER1, MFP1 |
| G002 | USER1, USER2, MFP1, MFP2 |
| ⋮ | ⋮ |

FIG. 4

| DESTINATION GROUP ID | SENDER ACCOUNT | POST DATE AND TIME | POST CONTENT |
|---|---|---|---|
| : | : | : | : |
| G001 | USER1 | 2019/01/28 10:00:01 | I WANT TO PRINT |
| G001 | USER1 | 2019/01/28 10:00:09 | IMAGE DATA(/data/image.jpg) |
| G001 | MFP1 | 2019/01/28 10:00:11 | I AM NOT BUSY RIGHT NOW! |
| G001 | USER1 | 2019/01/28 10:00:21 | I AM GOING TO PRINT |
| G001 | MFP1 | 2019/01/28 10:00:23 | SIZE? |
| : | : | : | : |
| G001 | MFP1 | 2019/01/28 10:01:10 | OK! I WILL BE WAITING FOR YOU! |
| : | : | : | : |

| OUTPUT INFORMATION ID | GROUP ID | OUTPUT DATA NAME | STORED DATE AND TIME | OUTPUT SETTING INFORMATION ||||| 
|---|---|---|---|---|---|---|---|---|
| | | | | PAPER SIZE | COLOR MODE | REPEAT PRINTING | SINGLE-SIDED/ DOUBLE-SIDED PRINTING | COPIES |
| 0001 | G001 | 0001.jpg | 2019/01/28 10:01:10 | A4 | MONOCHROME | 4 PAGES (REPEATING) | SINGLE-SIDED PRINTING | 3 |
| 0002 | G002 | 0002.jpg | 2019/01/29 11:22:14 | A3 | COLOR | - | SINGLE-SIDED PRINTING | 1 |
| 0003 | G006 | 0006.png | 2019/01/29 13:01:49 | A4 | MONOCHROME | - | DOUBLE-SIDED PRINTING | 1 |
| ⋮ | ⋮ | ⋮ | ⋮ | ⋮ | ⋮ | ⋮ | ⋮ | ⋮ |

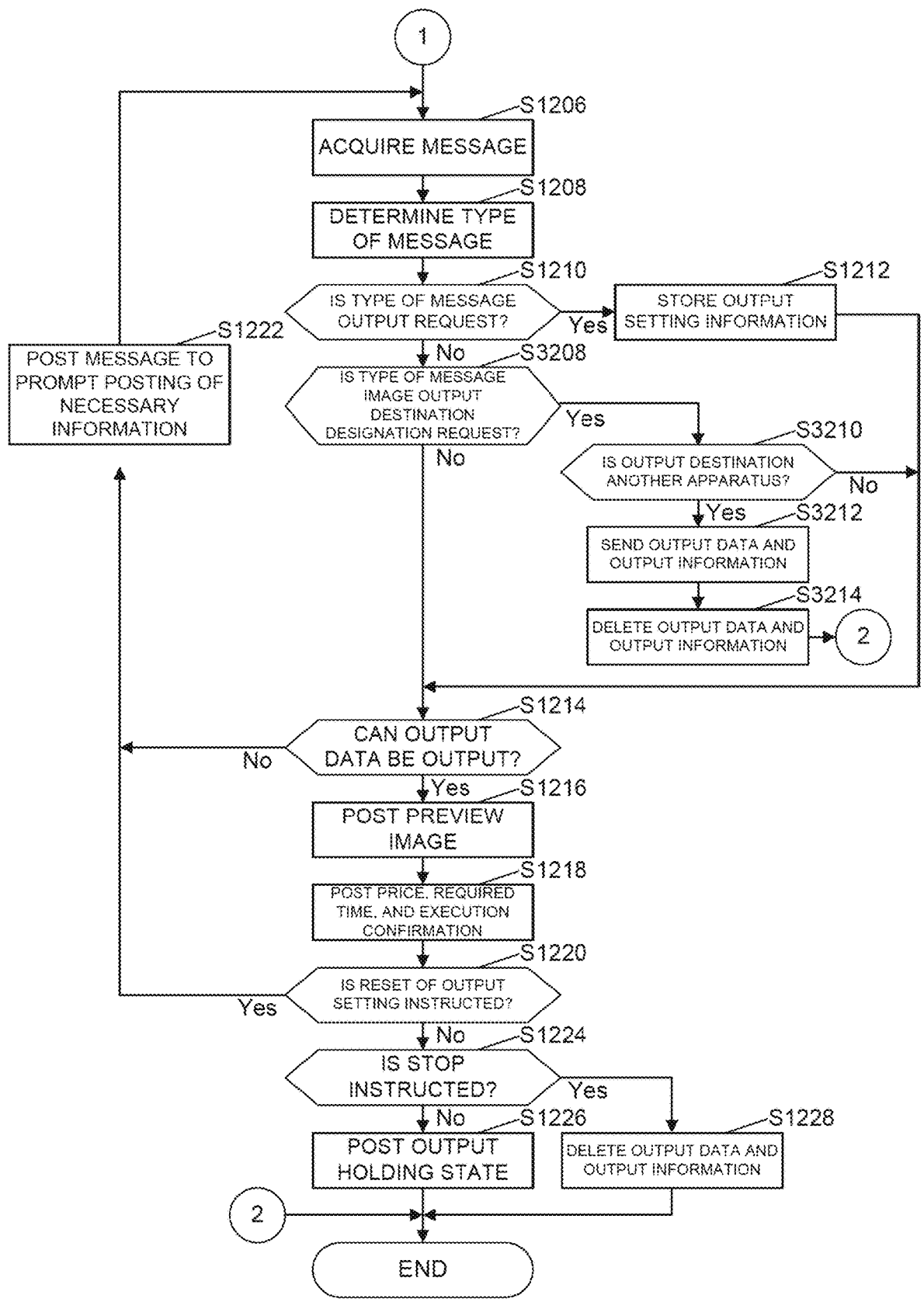

IMAGE FORMING APPARATUS, CONTROL METHOD, AND SYSTEM

This Nonprovisional application claims priority under 35 U.S.C. § 119(a) on Patent Application No. 2019-94706 filed in Japan on 20 May 2019, the entire contents of which are hereby incorporated by reference.

BACKGROUND OF THE INVENTION

Field of the Invention

The present invention relates to an image forming apparatus, a control method, and a system.

Description of the Background Art

Conventionally, a so-called network print service has been proposed in which a user uploads data such as image data using a network such as the Internet, and outputs the uploaded data from a multifunction peripheral installed in a store or the like.

A technique of improving convenience of the user who uses the multifunction peripheral installed in the stores or the like has also been proposed. A technique of improving convenience of the user who uses the multifunction peripheral installed in the stores or the like has also been proposed. For example, a technique is proposed in Japanese Unexamined Patent Application Publication No. 2015-138400 in which, when an operation status prediction server acquires operation status management information from service equipment such as the scattered multifunction peripherals to predict the operation statuses, the operation status prediction information that is predicted is transmitted to a mobile terminal as an accessing terminal.

However, in the technique described in Japanese Unexamined Patent Application Publication No. 2015-138400, while a prediction of the operation status is transmitted to the terminal, the current operation status is not transmuted. Thus, in order to recognize the actual operation stats, the user needs to be located near an image forming apparatus. As a result, in the case where the user has to wait in line (an output delay) when the user arrives at a place where the multifunction peripheral is installed or where a distance to the image forming apparatus is long, the user has to spend enormous time and effort.

In addition, in order to transmit the operation status prediction information, the user had to register contact information and the like with a service provider that transmits the operation status prediction information. Just as described, there is a problem that the user cannot check the operation status of the image forming apparatus in real time by a method for easily acquiring the operation status of the image forming apparatus.

In view of the above-described problem, the present invention has an object of providing an image forming apparatus and the like capable of acquiring a posted message and posting a status of the image forming apparatus on the basis of the acquired message.

SUMMARY OF THE INVENTION

In order to solve the above-described problem, an image forming apparatus according to the present invention is an image forming apparatus being included in a system with a server that provides messages posted from a plurality of apparatuses to each of the plurality of apparatuses sequentially, and having an image forming device to form an image on a basis of output data. The image forming apparatus includes a message acquisition device that acquires a message provided by the server, a message determination device that determines a type of the message acquired, a message generator that generates a message on a basis of a status of the image forming apparatus in a case where the type of the message acquired is an output request, and a message posting device that posts the message generated to the server.

A control method according to the present invention is a control method for an image forming apparatus being included in a system with a server that provides messages posted from a plurality of apparatuses to each of the plurality of apparatuses sequentially, and having an image forming device to form an image on a basis of output data. The control method includes acquiring a message provided by the server, determining a type of the message acquired, generating a message on a basis of a status of the image forming apparatus in a case where the type of the message acquired is an output request, and posting the message generated to the server.

A system according to the present invention is a system including a server and an image forming apparatus. The server includes a provider that provides messages posted from a plurality of apparatuses to each of the plurality of apparatuses sequentially. The image forming apparatus includes a message acquisition device that acquires a message provided from the server, a message determination device that determines a type of the message acquired, a message generator that generates a message on a basis of a status of the image forming apparatus in a case where the type of the message acquired is an output request, and a message posting device that posts the message generated to the server.

According to the present invention, it is possible to acquire the posted message and post the status of the image forming apparatus on the basis of the acquired message.

BRIEF DESCRIPTION OF THE DRAWINGS

FIG. 3 is a table illustrating an example of a data configuration of group information in the first embodiment.

FIG. 4 is a table illustrating an example of a data configuration of a message in the first embodiment.

FIG. 7 is a table illustrating an example of a data configuration of output information in the first embodiment.

FIG. 22 is a flowchart for illustrating a flow of output data storage processing in the third embodiment.

DESCRIPTION OF THE PREFERRED EMBODIMENTS

A description will hereinafter be made on embodiments of the present invention with reference to the drawings. In the present embodiment, a description will be made on an output system to which an image forming apparatus according to the present invention is applied as an example.

1. First Embodiment

1.1 Overall Configuration

Figure 1:
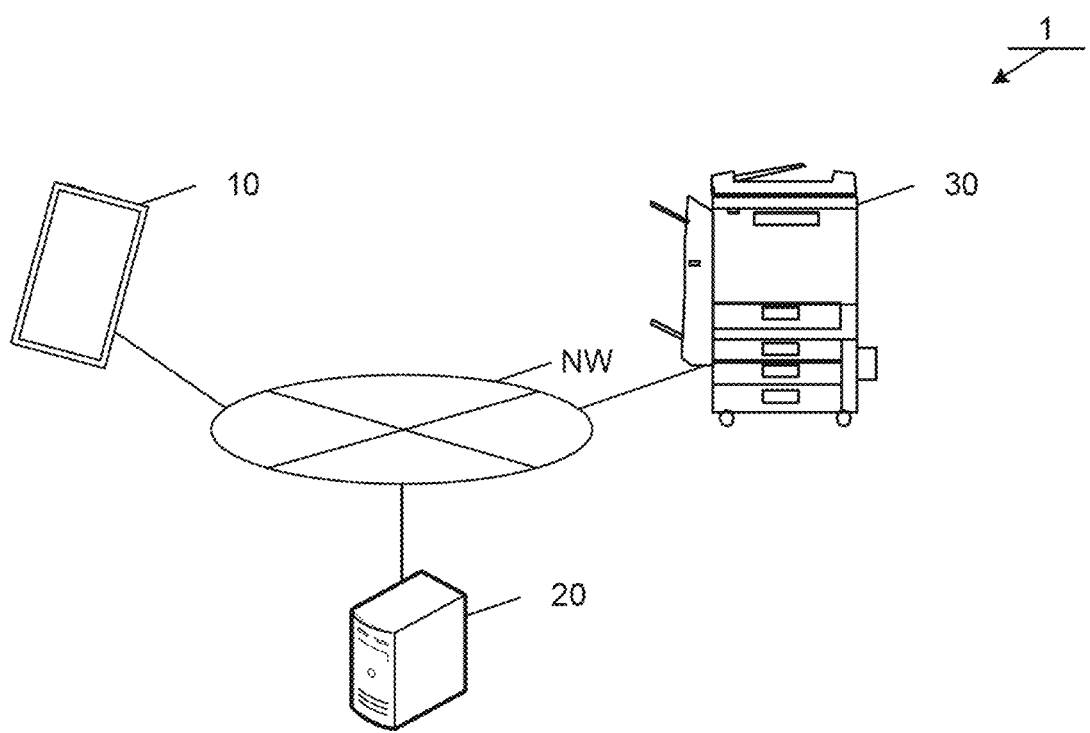
FIG. 1 is a view for illustrating an overall configuration of an output system in a first embodiment.

A description will be made on an overall configuration of an output system 1 according to the present embodiment with reference to FIG. 1. As illustrated in FIG. 1, the output system 1 is configured by connecting a terminal 10, a server device 20, and an image forming apparatus 30 via a network NW. The network NW may be constructed of an external network such as the Internet or constructed of a local area network (LAN) or the like.

The terminal 10 is an information processor and is a device such as a smartphone, a tablet computer, or a personal computer (PC), for example. The server device 20 is an information processor that provides function of allowing exchange of messages among a plurality of devices (hereinafter referred to as a "message exchange function"). The terminal 10 uses an application (hereinafter referred to as a "messenger application") for using the message exchange function so as to exchange the messages with one or a plurality of other devices.

In this embodiment, sending of the message from a device such as the terminal 10 to the server device 20 will be described as posting, and reception of the message by the device such as the terminal 10 from the server device 20 will be described as acquisition.

The message according to the present embodiment is data that is posted to the server device 20. The message may include necessary information among information on a message sender and a message destination and information on a content of the message (a content to be posted). The content to be posted may be text data or information on an image. The information on the image may be image data itself or information on location of the image data (for example, a uniform resource locator (URL) or file name), for example.

The image forming apparatus 30 is an apparatus that creates an image based on output data on recording paper or the like so as to output the image on the basis of the output data, and is a so-called multifunction peripheral. The output data is data that can be output from the image forming apparatus 30, and examples of the output data are the image data and file data such as a portable document format (PDF).

The image forming apparatus 30 in the present embodiment is also an apparatus that uses the message exchange function, thus posts the message to the server device 20, and acquires the message from the server device 20. In addition, when a message that includes the information on the image in the post content is sent from the terminal 10, the image forming apparatus 30 stores, as the output data, the image that is acquired on the basis of the information on the image, and creates the image based on the stored output data on the recording paper or the like.

1.2 Functional Configuration

1.2.1 Terminal

Figure 2:
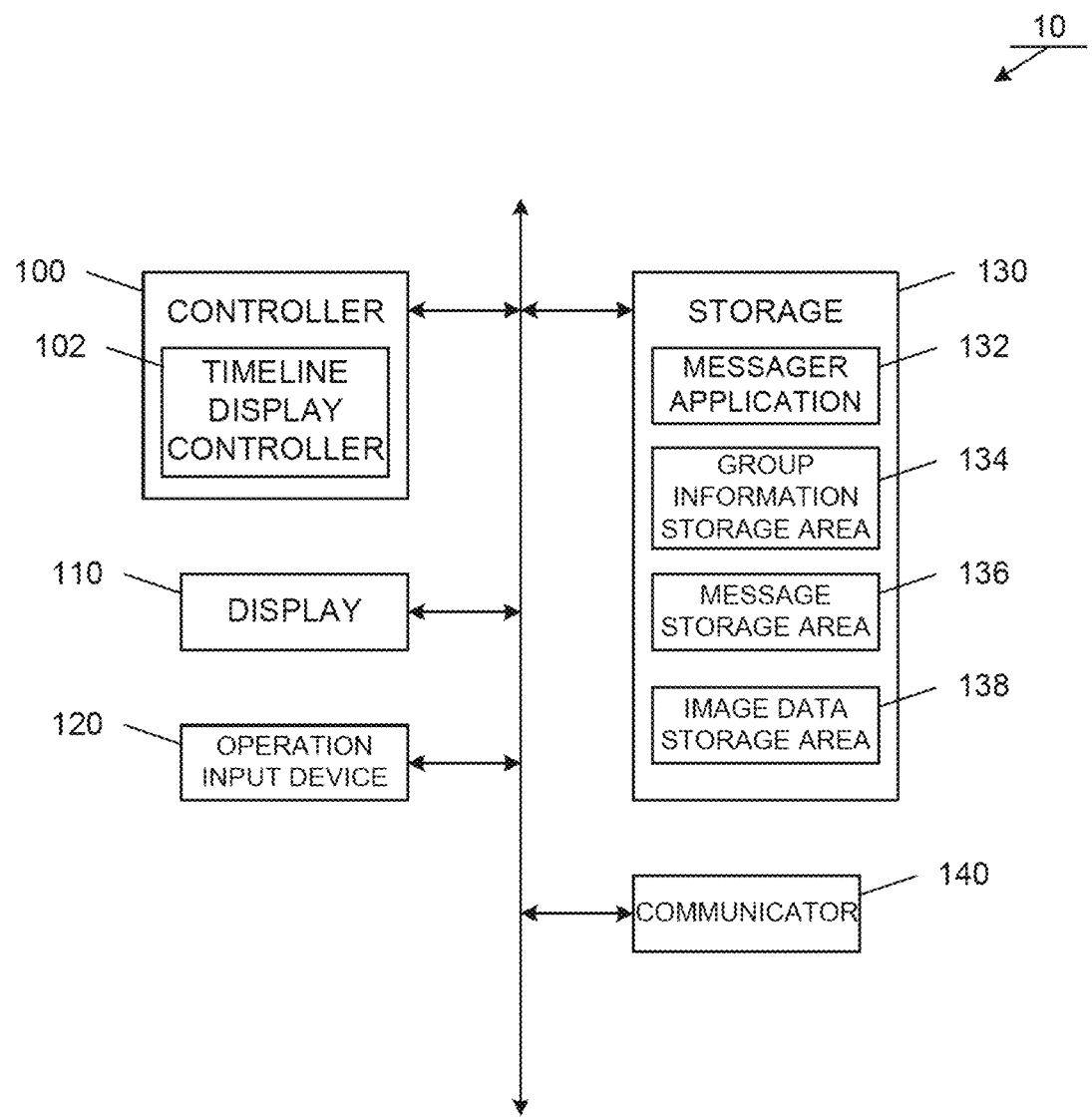
FIG. 2 is a diagram for illustrating a functional configuration of a terminal in the first embodiment.

A description will be made on a functional configuration of the terminal 10 with reference to FIG. 2. As illustrated in FIG. 2, the terminal 10 is configured to include a controller 100, a display 110, an operation input device 120, a storage 130, and a communicator 140.

The controller 100 is a functional unit that controls the entire terminal 10. The controller 100 implements various functions when loading and running various programs, and includes one or a plurality of arithmetic devices (for example, a central processing unit (CPU)), and the like, for example.

The controller 100 also functions as a timeline display controller 102 by using a messenger application 132, which will be described later. The timeline display controller 102 executes control for reading the messages stored in a message storage area 136, arranging information contained in the messages in an order of posted date and time of the messages, and displaying the information on the display 110. The display of the messages sequentially, just as described, will be referred to as a "timeline" in the present embodiment.

The timeline display controller 102 updates the timeline at predetermined timing. The tinning at which the timeline display controller 102 updates the timeline is when the message is posted, when the message is acquired, at predetermined time intervals, when a user performs an operation to display the timeline again, and the like.

The display 110 is a functional unit that displays various types of the information to the user. For example, the display 110 is constructed of a liquid crystal display (LCD) or the like. The operation input device 120 is a functional unit that allows the user to perform various operations. For example, the operation input device 120 is constructed of a touch panel that is superposed on the display 110. The touch panel detects a touch by an electrostatic dielectric method, a pressure sensitive method, or a known technique. Here, the operation input device 120 may be constructed of various operation devices such as a mouse and a keyboard.

A storage 130 is a functional unit that stores the various programs required for the operation of the terminal 10 and various types of data. The storage 130 includes a solid-state drive (SSD), a hard disk drive (HDD), or the like as a semiconductor memory, for example.

The storage 130 stores the messenger application 132, and has a group information storage area 134, the message storage area 136, and an image data storage area 138.

The messenger application 132 is an application for using the message exchange function. When the user performs an operation to post the message, the messenger application 132 generates a message that includes the content to be posted input by the user, the information on the destination and the sender, and the like, and posts the message to the server device 20. When the user performs an operation to acquire the message, the messenger application 132 sends a message provision request for requesting provision of the message to the server device 20. In the case where the server device 20 provides the message after the messenger application 132 sends the message provision request, the messenger application 132 acquires the provided message and stores the provided message in the message storage area 136.

The message provision request may include a narrowing condition for narrowing down the message to be provided. In the case where the narrowing condition is included in the message provision request, a message provider 220, which will be described later, in the server device 20 provides the message that satisfies the narrowing condition. For example, in the case where the timeline display controller 102 displays timeline of a particular group, the messenger application 132 sends the message provision request that includes a group ID of the group and the posted date and time of the latest displayed message. At this time, the server device 20 provides the message in which a destination group ID matches the group ID included in the message provision request and the posted date and time is later than the date and time included in the message provision request.

The group formation storage area 134 is an area for storing group information that is information on the group. The plurality of users' accounts are collectively managed as the group. The account is information allocated by the server device 20 and is information with which the device using the message exchange function can be identified. The group information on the group to which the terminal 10 belongs is stored in the group information storage area 134.

FIG. 3 is a table illustrating a data configuration of the group information in the present embodiment. As illustrated in FIG. 3, the group ID (for example, "G001") for identifying the group and the account (for example, "USER1, MFP1") that belongs to the group are stored in the group information.

As illustrated in FIG. 3, it is indicated that, in the case where the single group includes the two accounts, such a group exchanges one-to-one messages and that, in the case where the single group includes the three or more accounts, such a group exchanges one-to-many messages.

In the present embodiment, a description will be made that, on the basis of the group information, the messenger application 132 posts the message on a group basis and acquires the message on the group basis. In addition, a description will be made that the timeline display controller 102 provides timeline display of the messages on the group basis.

When the user performs an operation to create the group by selecting the one or a plurality of accounts performs an operation to add or delete the account that belongs to the group, the group information is stored on the basis of the operation.

In the case where the group information is stored in the certain terminal 10, the changed group information is sent to the other terminal 10, the server device 20, and the image forming apparatus 30. The device that receives the group information stores the received group information. In this way, consistency of the group information stored in the terminal 10, the server device 20, and the image forming apparatus 30 is maintained. For example, in the case where the terminal 10 stores the group information, the terminal 10 sends the stored group information to the server device 20. On the basis of the group information received from the terminal 10, the server device 20 sends the group information to the device that is identified by the account whose belonging group is changed (added or deleted). The server device 20 sends the group information to the device identified by the account that belongs to the group in which the belonging account is changed.

The message storage area 136 is an area for storing the message posted to the group to which the terminal 10 belongs. FIG. 4 is a table illustrating a data configuration of the message in the present embodiment. As illustrated in FIG. 4, in the message, the destination group ID (for example, "G001") used to identify the group as the message destination, the sender account (for example, "USER 1") used to identify the account as a message sender, the posted date and time (for example, "2019/01/28 10:00:01") indicative of a date and time when the message is posted, and the post content (for example, "I WANT TO PRINT") input by the user are stored.

In the case where the post content is the information on the image, the image data may be stored in the message itself, or, as illustrated in D100 in FIG. 4, the information on the location of the image data may be stored as the message.

The image data storage area 138 is an area for storing the image data. The image data that is stored in the image data storage area 138 is the image data received by the communicator 140 and the image data that is captured by an image input device such as a camera provided in the terminal 10.

The communicator 140 is a functional unit that allows the terminal 10 to communicate with an external device. For example, the communicator 140 is constructed of: a network interface card (NIC) used in the wireless LAN; and a communication module that can be connected to a long-term evolution (LTE)/LTE-advanced (LTE-A)/license-assisted access (LAA) using LTE/5G line.

1.2.2 Server Device

Figure 5:
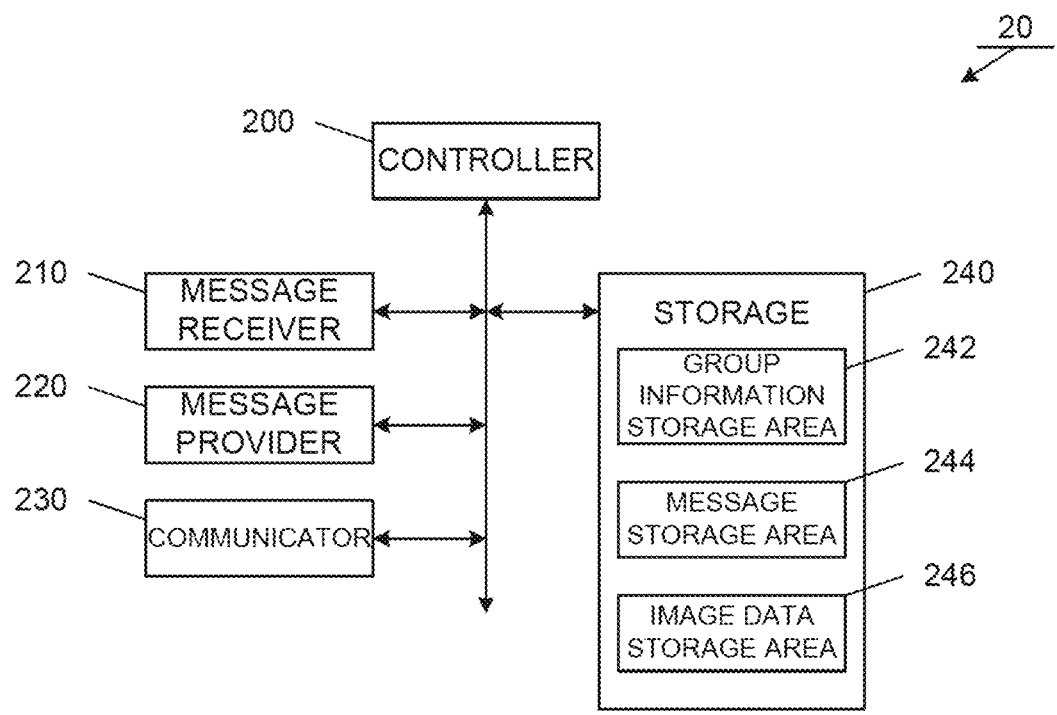
FIG. 5 is a diagram for illustrating a functional configuration of a server device in the first embodiment.

A description will be made on a functional configuration of the server device 20 with reference to FIG. 5. As illustrated in FIG. 5, the server device 20 is configured to include a controller 200, a message receiver 210, the message provider 220, a communicator 230, and a storage 240.

The controller 200 is a functional unit that controls the entire server device 20. The controller 200 implements various functions when loading and running various programs, and includes one or a plurality of arithmetic devices (the CPUs), and the like, for example.

The message receiver 210 is a functional unit that receives the posted message from the external device via the communicator 230 and stores the message in a message storage area 244. In the case where the post content of the message includes the information on the image, the message receiver 210 acquires the image data that is based on the information on the image, and stores the image data in an image data storage area 246. When the message is posted, the message receiver 210 may send a notification indicating that the message is posted to the device that belongs to the group designated as the destination.

The message provider 220 is a functional unit that, when receiving the message provision request via the communicator 230, provides (sends) the messages stored in the message storage area 244 sequentially to the device from which the message provision request is sent. In the case where the message provision request includes the narrowing condition, the message provider 220 provides the messages that satisfies the narrowing condition.

The communicator 230 is a functional unit for the server device 20 to communicate with the external device. For example, the communicator 230 is constructed of the NIC used in the wired/wireless LAN.

The storage 240 is a functional unit that stores various programs required for operation of the server device 20 and various types of data. For example, the storage 240 is constructed of the SSD, the HDD, or the like as the semiconductor memory.

The storage 240 has a group information storage area 242, the message storage area 244, and the image data storage area 246. The group information storage area 242 is an area for storing the group information of the device using the message exchange function. The message storage area 244 is an area for storing the message that is posted from the device using the message exchange function.

1.2.3 Image Forming Apparatus

Figure 6:
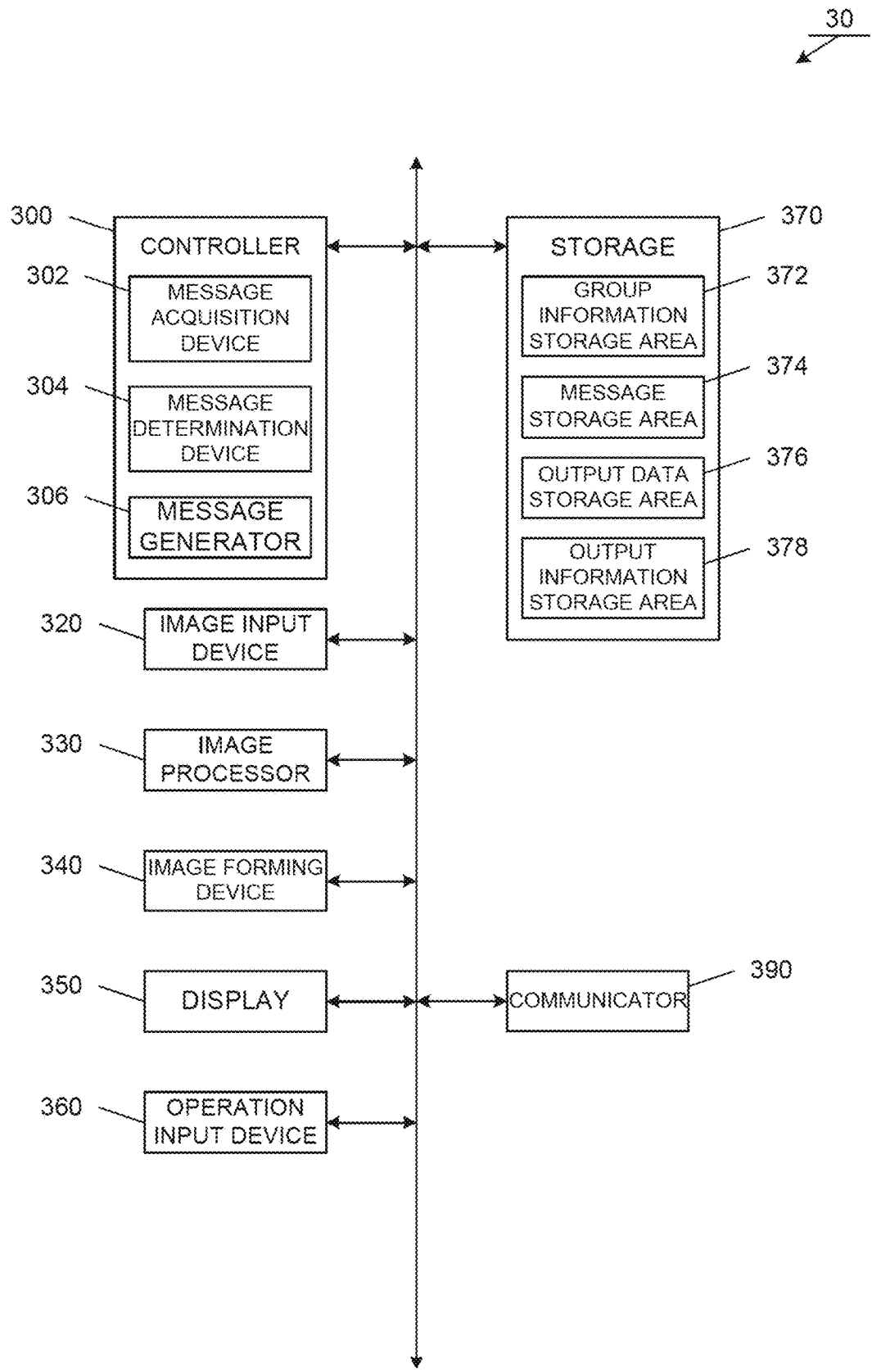
FIG. 6 is a diagram for illustrating a functional configuration of an image forming apparatus in the first embodiment.

A description will be made on a functional configuration of the image forming apparatus 30 with reference to FIG. 6. As illustrated in FIG. 6, the image forming apparatus 30 is configured to include a controller 300, an image input device 320, an image processor 330, an image forming device 340, a display 350, an operation input device 360, a storage 370, and a communicator 390.

The controller 300 is a functional unit that controls the entire image forming apparatus 30. The controller 300 implements various functions when loading and executing various programs, and includes one or a plurality of arithmetic devices (the CPUs), and the like, for example. The controller 300 functions as a message acquisition device 302, a message determination device 304, and a message generator 306 when loading and executing software (the program) stored in the storage 370.

The message acquisition device 302 is a functional unit that sends the message provision request to the server device 20, acquires the message from the server device 20, and stores the acquired message in a message storage area 374. The message acquisition device 302 may send the message provision request periodically, or may send the message provision request when receiving the notification indicating that the message is posted from the server device 20. In addition, the message acquisition device 302 may acquire the message, which has not been acquired, and the like for the particular group by including the narrowing condition in the message provision request.

The message determination device 304 is a functional unit that determines a type of the message. The type of the message indicates a content that is presented by the post content of the message. The message determination device 304 uses a natural language processing method (for example, extraction of a keyword and analysis of a sentence structure) and a statistical method such as machine learning, so as to analyze the post content and determine the type of the message. The message determination device 304 outputs a determination result including the type of the message to the controller 300.

In the present embodiment, the types of the message that are determined by the message determination device 304 are as follows.

Output Request

It is a message that requests the image forming apparatus 30 to post a status of the image forming apparatus 30 when the image data stored in the terminal 10 is output. The case where the type of the message is the output request includes a case where the post content of the message includes a phrase expressing the output request such as "I WANT TO PRINT" and a case where the post content includes the information on the image, for example. Here, examples of the phrases expressing the output request are "I WANT TO PRINT", "I AM GOING TO PRINT", and "PRINT", and these phrases only need to be stored in the storage 370.

Output Execution Request

It is a message that requests the image forming apparatus 30 to execute processing to store necessary information for the output. The case where the type of the message is the output execution request is a case where the post content includes a phrase expressing the output execution request such as "I AM GOING TO PRINT", for example.

Output Setting Request

It is a message that requests the image forming apparatus 30 to designate or change an output method for the output data (an output setting). The case where the type of the message is the output setting request is a case where the post content includes phrases related to the output method such as paper size "A4" and a color mode "COLOR", for example. Accordingly, the message determination device 304 determines that the type of the message is the output setting request when the post content of the message is the text data such as "A4" and "OUTPUT IN COLOR". The message determination device 304 may include the phrases in the post content, such as "A4" and "COLOR", in a determination result. In this way, the controller 300, to which the determination result is output, can identify that the output settings desired by the user are "A4" and "COLOR".

Output Start Request

It is a message that requests the image forming apparatus 30 to start outputting the output data. The case where the type of the message is the output start request is a case where the post content includes a phrase expressing a start of the output such as "I WANT TO EXECUTE PRINTING" or a phrase expressing that the user stands in front of the image forming apparatus 30 such as "I AM HERE", for example.

In the case where the type of the message is none of the above-described types, the message determination device 304 only needs to include, as the determination result, information indicating that the type of the message is none of the types.

The message generator 306 is a functional unit that generates the message on the basis of an instruction of the controller 300 and outputs the generated message to the controller 300. The message generator 306 generates the post content included in the message by selecting an appropriate fixed sentence from fixed sentences that are stored in advance or generating a sentence in which specified information is embedded on a template that is stored in advance.

The image input device 320 is a functional unit that reads a document input in the image forming apparatus 30 and generates the image data. For example, the image input device 320 is connected to a document reader (for example, a scanner), and generates the image data that is based on the document input from the document reader. The image processor 330 is a functional unit that executes various types of image processing on the image data. For example, the image processor 330 executes image data sharpening processing and color conversion processing.

The image forming device 340 is a functional unit that forms the image on a recording medium (for example, the recording paper), and the image is based on the image data generated by the image input device 320 and the output data stored in an output data storage area 376. The image forming device 340 is constructed of a laser printer using an electrophotographic method, or the like, for example.

The display 350 is a functional unit that displays the various types of the information to the user. For example, the display 350 is constructed of the LCD, an organic electro-luminescence (EL) panel, and the like. The operation input device 360 is a functional unit that allows the user to perform various operations. For example, the operation input device 360 is constructed of the touch panel that is superposed on the display 350. The touch panel detects the touch by the electrostatic dielectric method, the pressure sensitive method, or the known technique.

The storage 370 is a functional unit that stores the various programs required for operation of the image forming apparatus 30 and various types of data. The storage 370 is constructed of the SSD, the HDD, or the like as the semi-conductor memory for example.

The storage 370 has a group information storage area 372, the message storage area 374, the output data storage area 376, and an output information storage area 378. The group information storage area 372 is an area where the group information of the group, to which the image forming apparatus 30 belongs, is stored. The message storage area 374 is an area where the messages posted to the group, to which the image forming apparatus 30 belongs, are stored.

The output data storage a 376 is an area where the image data that is based on the information on the image included in the post content of the message is stored as the output data. In the present embodiment, a description will be made that the output data is identified by an output data name.

The output information storage area 378 is an area for storing output information that is information on output processing executed by the image forming apparatus 30. FIG. 7 is a table illustrating a data configuration of the output information in the present embodiment. As illustrated inn FIG. 7, the output information includes: an output information ID (for example, "0001") used to identify the output information; the group ID (for example, "G001") used to identify the group; and the output data name (for example, "0001.jpg") used to identify the image data to be output; stored date and time (for example, "2009/01/28 10:01:10") indicative of a date and time when the output information is stored; and output setting information on the output setting of the output data.

For example, as illustrated in FIG. 7, the output setting information includes: the paper size of the recording paper (for example, "A4"); the color mode at the time of the output (for example, "MONOCHROME"); repeat printing (for example, "4 PAGES (REPEATING)") that is a setting on which a plurality of the single image is printed on one page; single-sided/double-sided printing (for example, "SINGLE-SIDED PRINTING") indicative of an output side of the recording paper; and copies (for example, "3") indicative of the number of copies at the of the output. The image forming apparatus 30 outputs the output data on the basis of the output setting information. The output setting information may include a part of the above items, or may include an item other than the above items.

In the present embodiment, a description will be made that, when the user outputs the output data, the corresponding output data and the corresponding output information are deleted. Thus, the output data and the output information that are not output by the user are stored in the output data storage area 376 and the output information storage area 378.

The communicator 390 is a functional unit that allows the image forming apparatus 30 to communicate with the external device. For example, the communicator 390 is constructed of the NIC used in the wired/wireless LAN and the communication module that can be connected to the LTE/LTE-A/LAA/5G line.

1.3 Processing Flow

Next, a description will be made on a processing flow of the image forming apparatus 30 in the present embodiment. t. A description will be based on an assumption that the terminal 10 and the image forming apparatus 30 belong to the same group.

Figure 8:
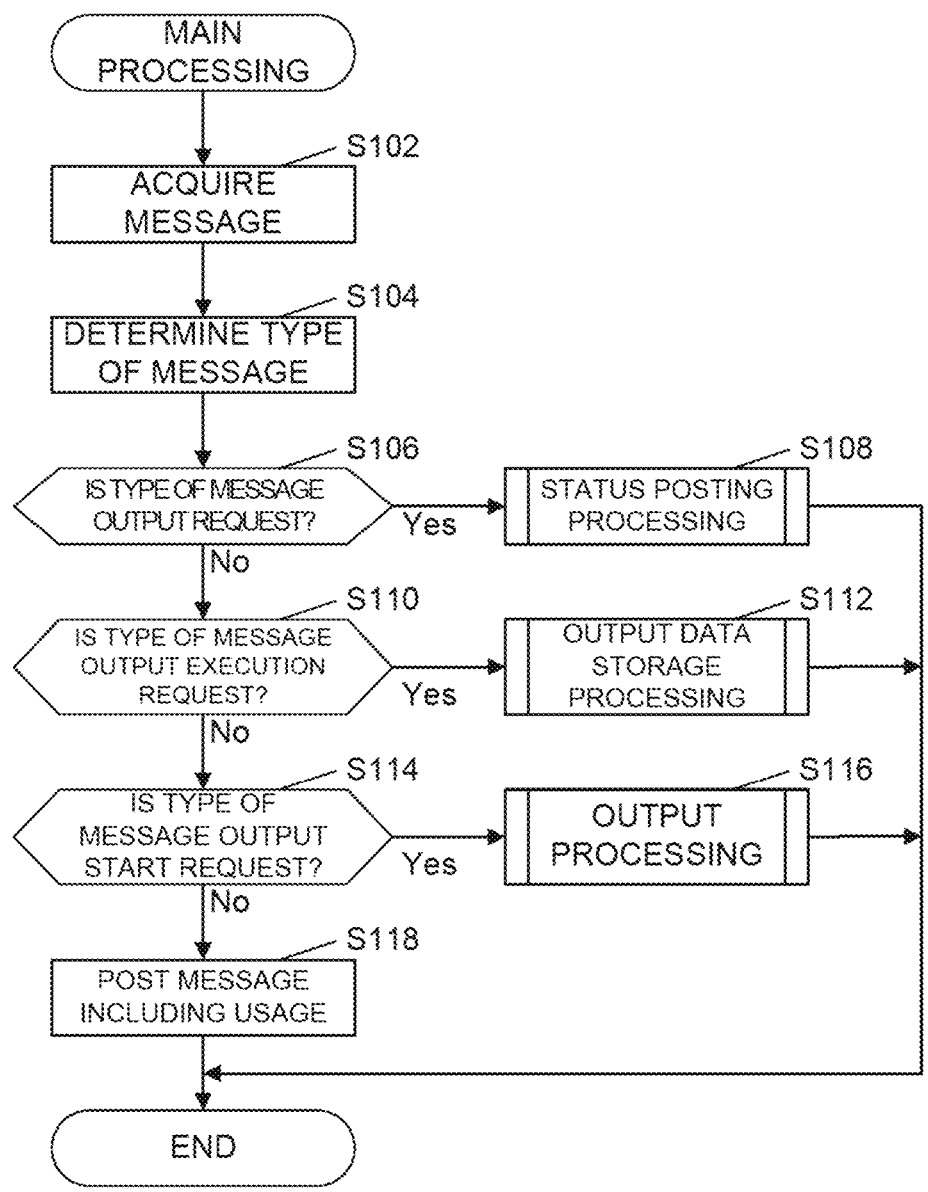
FIG. 8 is a flowchart for illustrating a flow of main processing of the image forming apparatus in the first embodiment.

A description will be made on a flow of main processing by the image forming apparatus 30 with reference to FIG. 8. First, the message acquisition device 302 acquires the message from server device 20 (step S102). Then, the message determination device 304 determines the type of the message acquired by the message acquisition device 302, and outputs the determination result to the controller 300 (step S104).

Next, the controller 300 determines whether the type of the message included in the determination result is the output request. If the type of the message is the output request, the controller 300 executes status posting processing (step S106; Yes→step S108). The status posting processing is processing to post the status of the image forming apparatus 30.

As the status of the image forming apparatus 30, for example, the following statuses are considered.
(1) Whether the image forming apparatus 30 is currently in operation
(2) The number of the output data stored in the output data storage area 376
(3) The number of persons near the image forming apparatus 30
(4) A utilization rate in a specified period.

Of these statuses, for example, in regard to (1) of the case where the image forming apparatus 30 is currently in operation, it is determined that the image forming apparatus 30 is currently in operation when the operation is input via the operation input device 360 or when a job is performed on the basis of the operation input via the operation input device 360. In regard to (3), a human-presence sensor or an imaging device such as a camera is connected to the image forming apparatus 30, and the image forming apparatus 30 counts the number of persons on the basis of information input by the sensor or a video. In regard to (4), a period in which the image forming apparatus 30 is in operation is measured within the last 24 hours, and the measured period is divided by 24 hours to calculate the utilization rate.

The image forming apparatus 30 may post a status other than the above-described statuses, or may post a combination of the several statuses.

Figure 9:
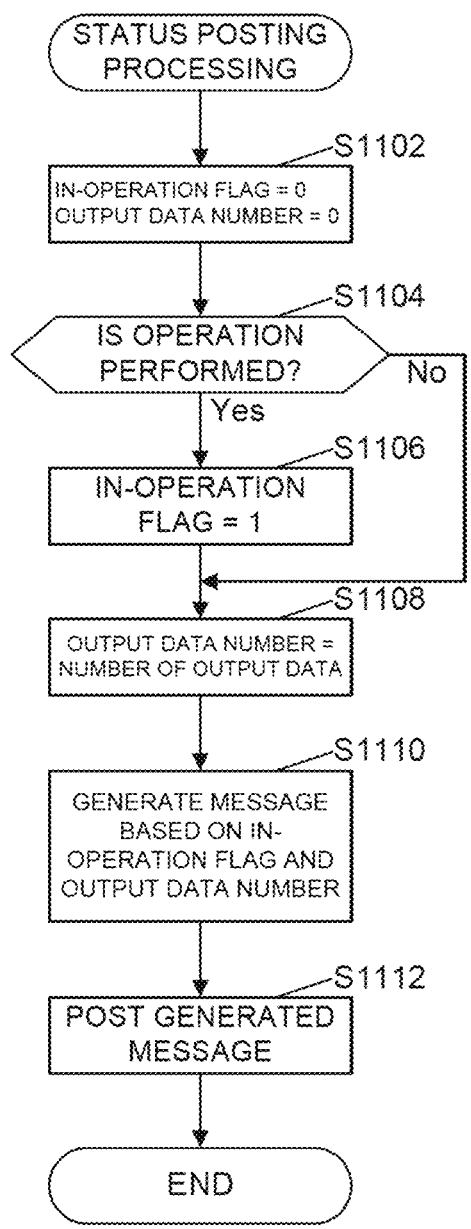
FIG. 9 is a flowchart for illustrating a flow of status posting processing in the first embodiment.

A flow of the status posting processing will be described with reference to FIG. 9. First, the controller 300 initializes two variables, which are an in-operation flag and the output data number, by assigning "0" thereto (step S1102). These variables are used to temporarily store the information on the status of the image forming apparatus 30. The in-operation flag is information on whether the user who uses the image forming apparatus 30 exists and whether such a user operates the image forming apparatus 30. If the in-operation flag is "1", it is indicated that the user who operates the image forming apparatus exists. The output data number is the number of the output data stored in the output data storage area 376, that is, the number of the output data that has not been output by the user.

Next, the controller 300 determines whether the image forming apparatus 30 is operated. If the image forming apparatus 30 is operated, "1" is assigned to the in-operation flag (step S1104; Yes→step S1106). Then, the controller 300 assigns the number of the output data that is stored in the output data storage area 376 to the output data number (step S1108).

Next, the controller 300 inputs the in-operation flag and the output data number to the message generator 306, and instructs the message generator 306 to generate the message that is based on the status of the image forming apparatus 30. The message generator 306 generates the message that includes the post content based on the in-operation flag and the output data number (step S1110). For example, the message generator 306 regards a sum of a value of the in-operation flag and a value of the output data number as the number of persons, and generates the message that has the text data as the post content. The text data includes the number of persons and the brief status of the image forming apparatus 30 such as "CROWDED (10 PERSONS)". As another example of the post content, when the value of the in-operation flag is 1, the post content may include the text data such as "CURRENTLY IN OPERATION", or may use the output data number to include the text data such as "THERE ARE SEVEN OUTPUT DATA". The post content may be the information on the image in which the status of the image forming apparatus 30 is represented by a graph, an icon, or the like. That is, the post content that is included in the message by the message generator 306 can have various forms of expression as long as the status of the image forming apparatus 30 can be expressed. The expression of the post content may be determined in advance, or can be set by an administrator of the image forming apparatus 30, or the like. When the message generated by the message generator 306 is output, the controller 300 posts the generated message to the server device 20 (step S1112).

Referring back to FIG. 8, if the type of the message included in the determination result is not the output request, then the controller 300 determines whether the type of the message included in the determination result is the output execution request (step S106; No→step S110). If the type of the message included in the determination result is the output execution request, the controller 300 executes output data storage processing (step S110; Yes→step S112).

Figure 10:
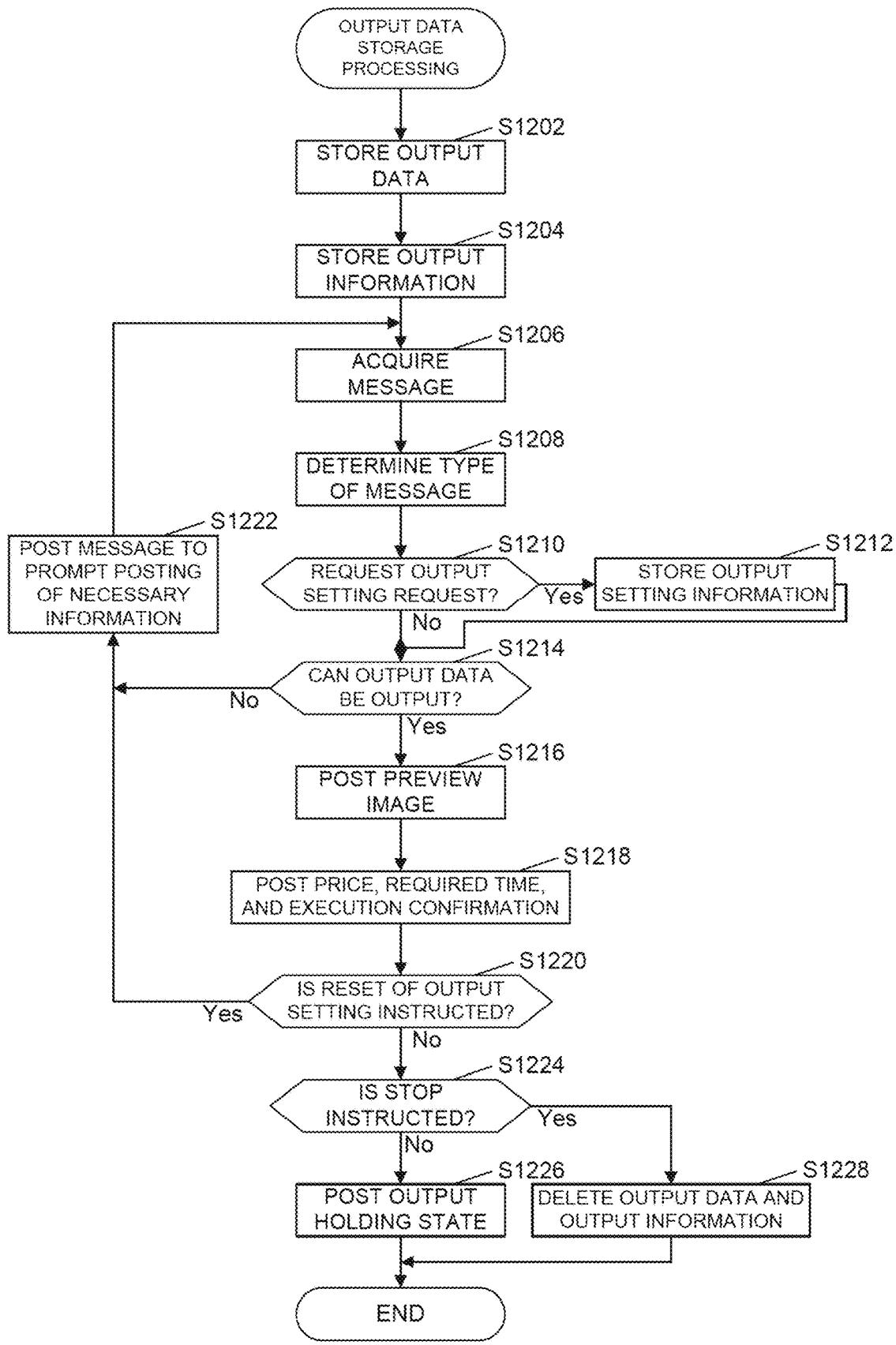
FIG. 10 is a flowchart for illustrating a flow of output data storage processing in the first embodiment.

A flow of the output data storage processing will be described with reference to FIG. 10. In the output data storage processing, first, the controller 300 stores the image data as the output data on the basis of the acquired message (step S1202). For example, in the case where the message that has already been acquired includes the information on the image, the controller 300 acquires the image data that is based on the information on the image, and stores the image data in the output data storage area 376. In the case where the message including the information on the image has not been acquired, the controller 300 may post the message that urges posting of the message including the information on the image.

Next, the controller 300 stores the output information (step S1204). At this time, the output information that is stored by the controller 300 includes the output information ID, the group ID that is included in the message acquired in step S104, the output data name of the output data that is stored in step S1202, and the stored time.

Next, the message acquisition device 302 acquires the message from the server device 20 (step S1206). The message determination device 304 determines the type of the acquired message, and outputs the determination result to the controller 300 (step S1208).

The controller 300 determines whether the type of the message included in the determination result is the output setting request (step S1210). If the type of the message is the output setting request, the controller 300 stores the value in the output setting information of the output information on the basis of the phrases included in the post content (step S1210; Yes→step S1212). For example, in the case where the post content includes the phrase related to the size of the recording paper, such as "A4" or "B5", the controller 300 stores the value such as "A4" or "B5" as the value of the "PAPER SIZE" in the output setting information. At this time, the controller 300 also stores the current time as the stored time.

Next, the controller 300 determines whether the output data can be output (step S1214). The case where the output data can be output is a case where the image forming apparatus 30 can form the image on the basis of the output data and the output setting information.

If the output data can be output, the controller 300 generates the message that includes information on a preview image of the image to be output as the post content via the message generator 306, and post such a message (step S1214; Yes→step S1216). If the output data cannot be output, the controller 300 generates the message that urges the user to post information necessary for the output via the message generator 306, and posts the generated message (step S1214; No→step S1222). An example of the message that urges the user to post the necessary information is a message that includes, as the post content, a content that urges posting related to the output setting such as "SIZE?" or "ANY DETAILED SETTING?".

Next, the controller 300 generates the message that includes contents such as price required to output the output data, required time, and execution confirmation via the message generator 306, and posts the generated message (step S1218). The execution confirmation to inquire of the user about an instruction on whether to output the output data based on the output setting information from the image forming apparatus 30, whether to reset the output setting, or whether to stop the output. For example, the message generator 306 generates the message that includes, as the post content, the text data such as "IS THIS SETTING OK?" or "PLEASE ANSWER 1: THIS IS OK, 2: REVIEW OUTPUT SETTING, 3: STOP OUTPUT".

Next, the controller 300 determines the user's instruction on the execution confirmation. First, it is determined whether the reset of the output setting is instructed (step S1220). For example, the case where the reset of the output setting is instructed is a case where the message acquisition device 302 acquires the message that includes, as the post content, a content that the output setting is reset. If the reset of the output setting is instructed, the controller 300 posts the message that urges the user to post the information necessary for the output (step S1220; Yes→step S1222). At this time, the controller 300 may clear a value of the output setting information, and may store the output setting information from the beginning. Alternatively, in order to only change the output setting, the change of which is desired by the user, the output setting information that has already been stored may be overwritten on the basis of the content of the message of the output setting request.

If the reset of the output setting is not instructed, the controller 300 determines whether the stop of the output is instructed (step S1220; No→step S1224). For example, the case where the stop of the output is instructed is a case where the message acquisition device 302 acquires the message including, as the post content, a content that the output is stopped.

If the stop of the output is not instructed, such as a case where the execution of the output is instructed, the controller 300 makes the message generator 306 generates the message that includes the post content indicative of an output holding state, and posts the generated message (step S1224; No→step S1226). The output holding state is a state where the output data and the output information corresponding to the output data are stored, and is also a state where the image forming apparatus 30 has not started the output on the basis of the output data (a non-output state). The post content indicative of the output holding state is the text data such as "I WILL BE WAITING FOR YOU", for example.

If the stop of the output is instructed, the controller 300 deletes the output data stored in step S1202 and the output information stored in step S1204 (step S1224; Yes→step S1228).

Referring back to FIG. 8, if the content of the request is not the output execution request, then the controller 300 determines whether the type of the message included in the determination result is the output start request (step S110; No→step S114). If the type of the message is the output execution request, the controller 300 executes the output data storage processing (step S114; Yes→step S116).

Figure 11:
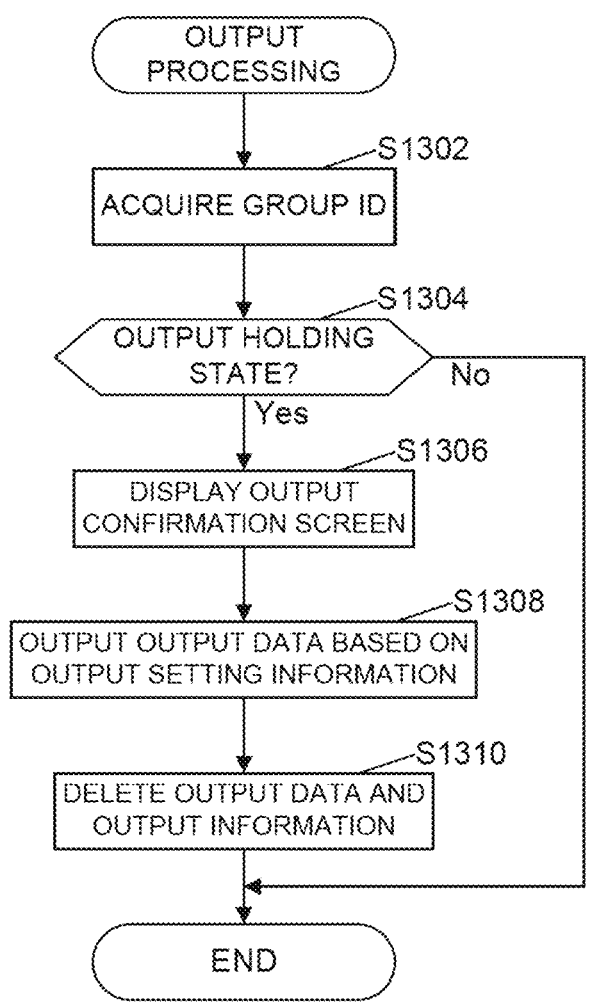
FIG. 11 is a flowchart for illustrating a flow of status output processing in the first embodiment.

A flow of the output processing will be described with reference to FIG. 11. In the output processing, first, the controller 300 acquires the group ID included in the message that is acquired in step S104 (step S1302). Then, the controller 300 determines whether the group that corresponds to the acquired group ID is in the output holding state (step S1304). More specifically, the controller 300 narrows down the output information by using the group ID that is acquired in step S1302. As a result of narrowing down, in the case where one or more types of the output information are acquired, the output data that has not been output is stored. Thus, the controller 300 can determine that the group is in the output holding state.

If the group is in the output holding state, the controller 300 displays an output confirmation screen for outputting the output data on the display 350 (step S1304; Yes→step S1306). The output confirmation screen is a screen for instructing the output of the output data to the user, and is also a screen that includes a button for instructing the output the output data, the price for the output, and the like.

In the case where the user instructs the output of the output data, the controller 300 outputs the output data on the basis of the output setting information (step S1308). When the output is completed, the controller 300 deletes the output data that is output and the output information corresponding to the output data (step S1310).

Referring back to FIG. 8, if the type of the message is not the output start request, the controller 300 generates the message that includes usage via the message generator 306, and posts the generated message (step S114; No→step S118). As, for example, there is a message that includes the posting content that prompts the user to post the image data, or there is output data in the output holding state. Examples of the message that includes the usage are a message that includes the post content to urge posting of the image data and a message that guides posting of the output start request due to the output data in the output holding state.

1.4 Operation Example

Figure 12:
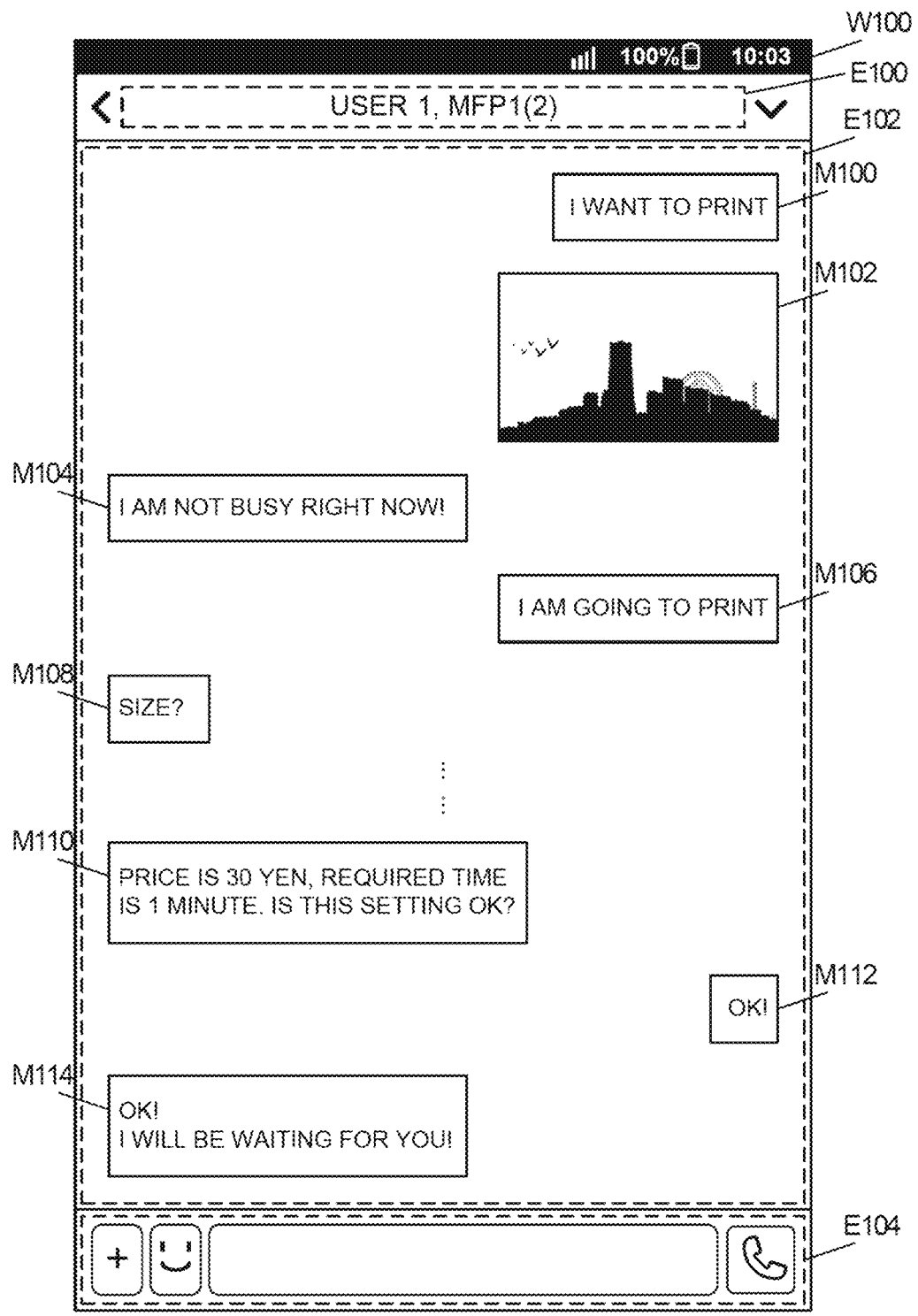
FIG. 12 is a view of an operation example in the first embodiment.

A description will be made on an operation example the present embodiment with reference to the drawings. FIG. 12 is a view of an example of a display screen W100 displayed on the display 110 when when the controller 100 loads and runs the messenger application 132. The display screen W100 includes: an area E100 where the accounts that belong to the group are displayed; an area E102 where the timeline is displayed; and an area E104 used to input the post content and send the message.

The area E100 in FIG. 12 indicates the group in which the user of the terminal 10 (the account is the "USER 1") and the image forming apparatus 30 (the account is "MFP1") exchange the one-to-one messages.

In the area E120 where the timeline is displayed, the messages are displayed sequentially. The message may be displayed in a manner that the senders can be distinguished. For example, as illustrated in FIG. 12, the messages, the sender of which is the user of the terminal 10, are displayed on a right side of the screen, and the messages, the sender of which is the image forming apparatus 30, are displayed on a left side of the screen. Due to such display, it is possible to visually display conversation between the terminal 10 and the image forming apparatus 30 to the user of the terminal 10. As the display to distinguish the sender, a background color and a background shape of the area where the messages are displayed may be changed, a character color may be changed, or information on the sender (for example, the account or the user name) may be displayed. Alternatively, some of the display methods may be combined.

First, the user posts a message M100 that includes the text data "I WANT TO PRINT" as the post content and a message M102 that includes the information on the image as the post content. The image forming apparatus 30 acquires the message and determines the types of the acquired message M100 and the acquired message M102. In the case where the type of the message is the output request, the image forming apparatus 30 posts a message M104 that includes the status of the image forming apparatus 30 as the post content (for example, a message that includes the text data "I AM NOT BUSY RIGHT NOW!" as the post content).

Next, the user posts a message M106 that includes the text data "I AM GOING TO PRINT". The image forming apparatus 30 acquires the message, and determines the type of the acquired message M106. In the case where the type of the message is the output execution request, the image forming apparatus 30 posts a message M108 that inquires about the output setting (for example, a message that includes the text data "SIZE?" as the text data). Here, since the message M102 that has already been posted by the user includes the information on the image, the image forming apparatus 30 acquires the image data on the basis of the message M102, and stores the image data as the output data.

The image forming apparatus 30 repeats inquiring about the output setting, and thereby stores the information necessary for the output of the output data. In the case where the output data can be output, the image forming apparatus 30 posts a message M110 that includes the contents of the price, the required time, and the execution confirm nation as the post contents.

In the case where the user does not instruct the reset of the output setting or the stop to the message M110 that includes the execution confirmation and posts a confirmation message M112, the image forming apparatus 30 posts a message M114 indicative of the output holding state.

Figure 13A:
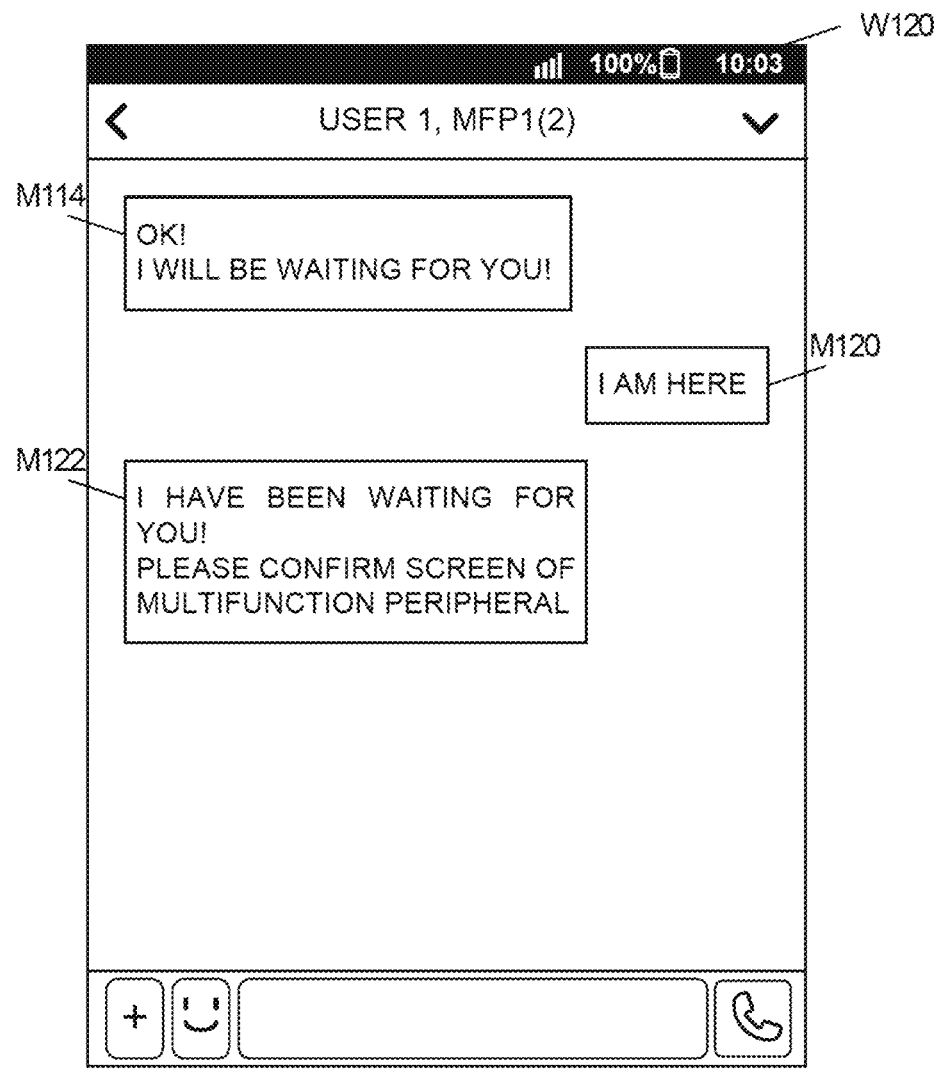
FIGS. 13A and 13B are views of an operation example in the first embodiment.
Figure 13B:
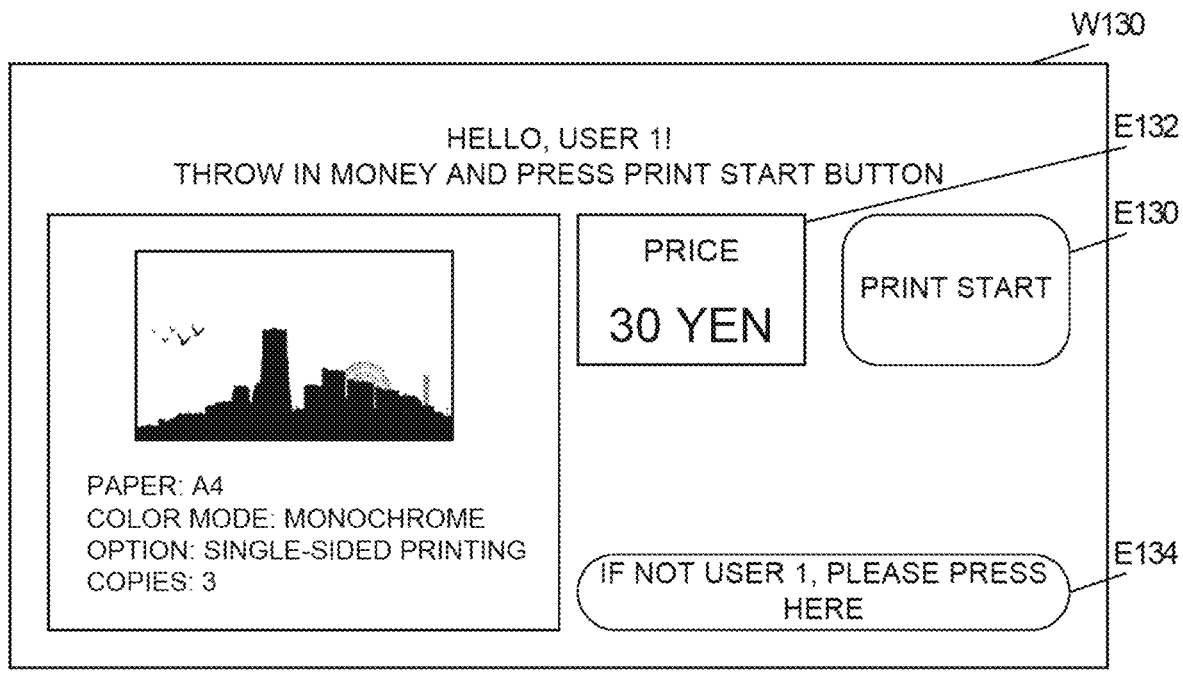

FIG. 13A is a view of an example of a display screen W120 that is displayed on the display 110 in the case where the controller 100 loads and runs the messenger application 132, and is an example of the display screen after the image forming apparatus 30 posts the message M114 in FIG. 13. FIG. 13B is a view of an example of an output confirmation screen W130 that is displayed on the display 350 in the image forming apparatus 30.

As illustrated in FIG. 13A, the user posts a message 20 that includes the text data "I AM HERE". The image forming apparatus 30 acquires the message, and determines the type of the acquired message M120. In the case where it is determined that the type of the message is the output start request, the output confirmation screen W130 illustrated in FIG. 13B is displayed on the display 350. The output confirmation screen W130 includes a button E130 used to instruct the start of the output and an area E132 where the price is displayed. In addition, as illustrated in FIG. 13B, in the case where the user other the user who has instructed the output operates the image forming apparatus 30, a button E134 used to instruct not to start the output may be included.

Figure 14A:
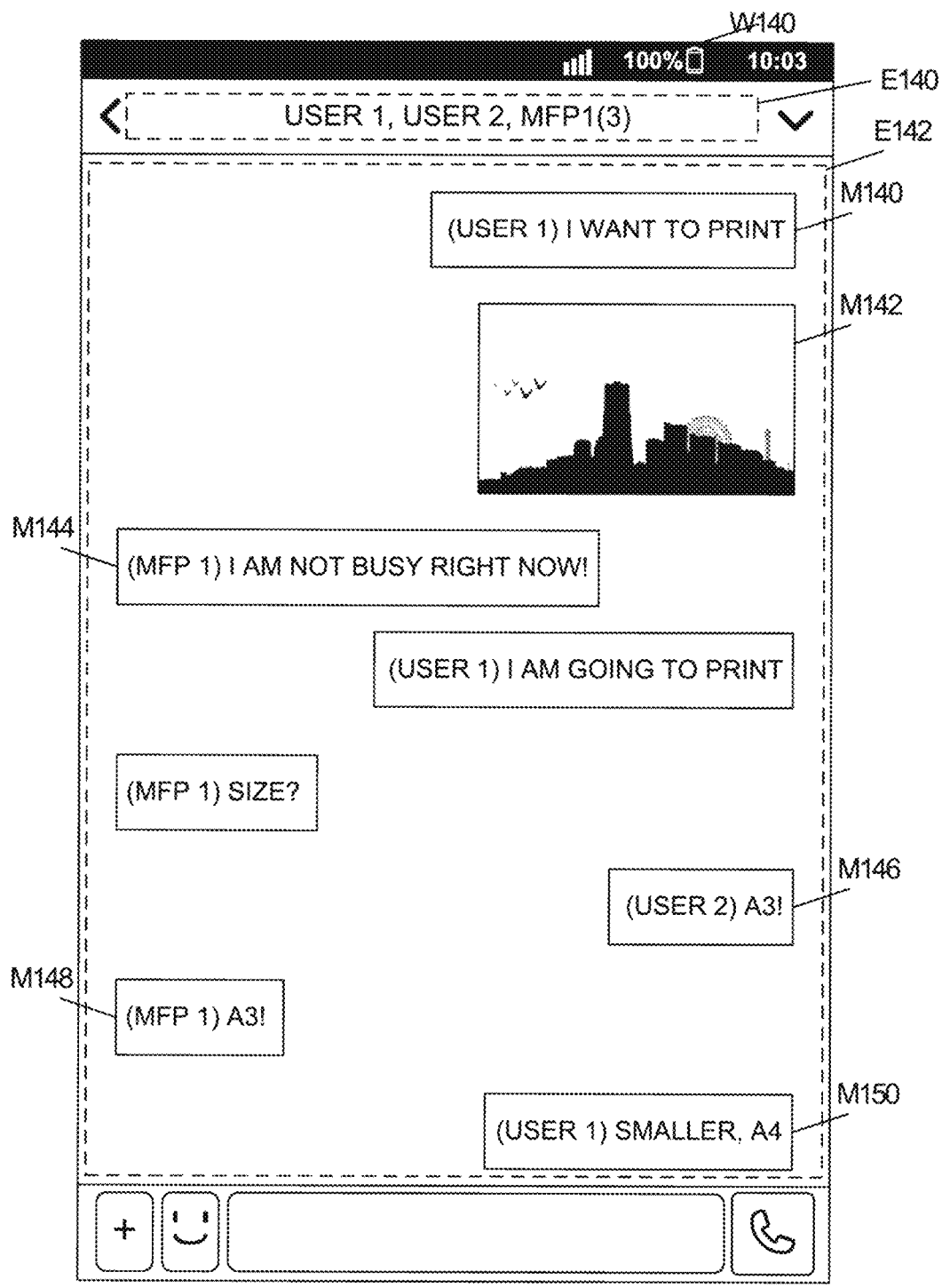
FIGS. 14A and 14B are views of an operation example in the first embodiment.
Figure 14B:
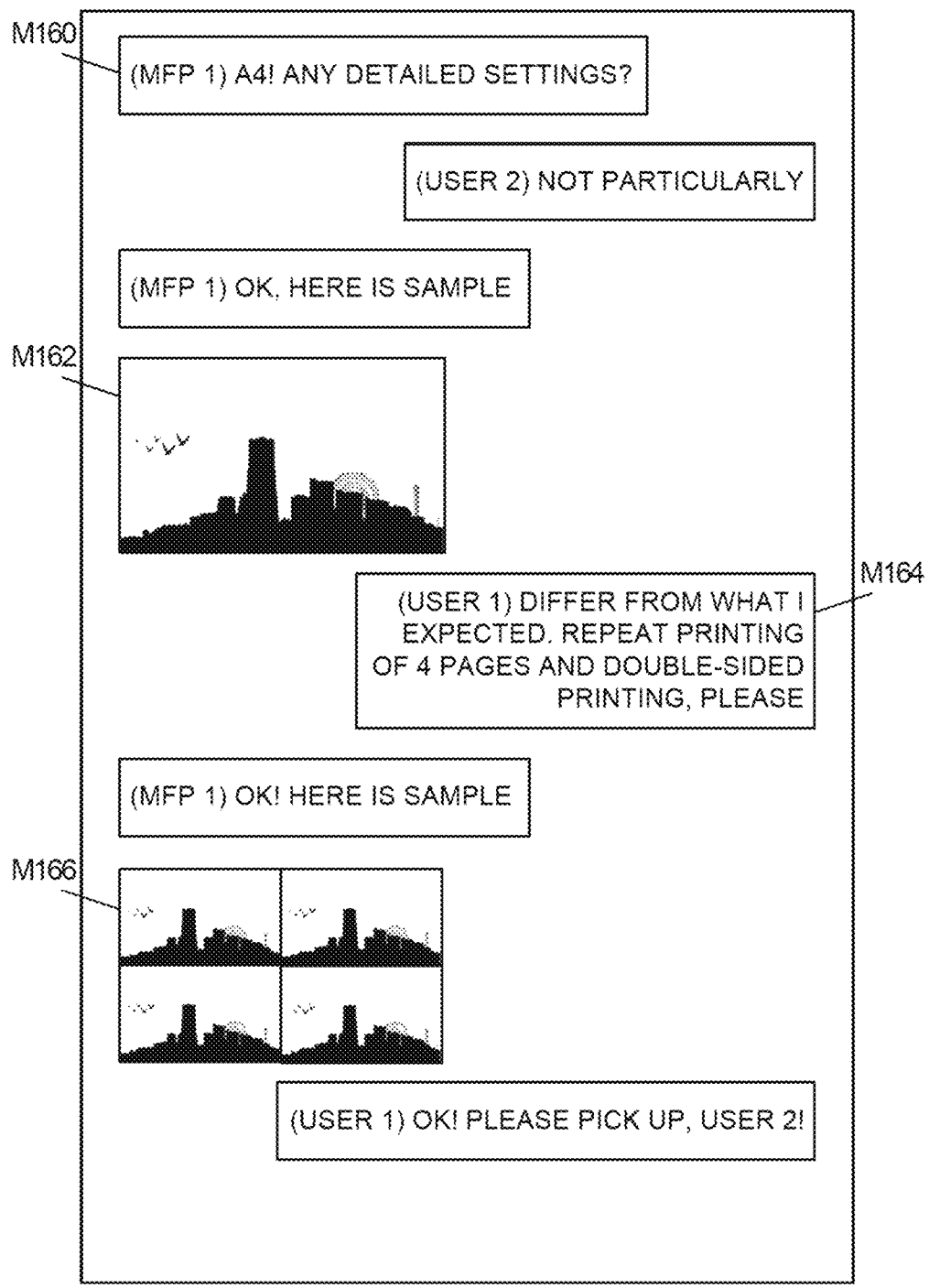

FIG. 14A is a view of an example of a display screen W140 that is displayed on the display 110 in the case where the controller 100 loads and runs the messenger application 132 for the group, to which the plurality of users belong. FIG. 14B is a view that only illustrates area E142 included in the display screen W140. In the area E142, the timeline is displayed. The area E142 included in FIG. 14A and the area illustrated in FIG. 14B continue sequentially.

In addition, FIG. 14A is a view of an operation example of the group in which the plurality of users who use the terminal 10 (the accounts are the "USER 1" and the "USER 2") and the image forming apparatus 30 (the account is "MFP1") exchange the one-to-many messages as illustrated in an area E140. Even in such a case, the image forming apparatus 30 executes the status posting processing or the like on the basis of the message that is posted by the user.

With reference to FIG. 14A, for example, one of the users who belong to the group posts a message M140 that includes the text data "I WANT TO PRINT" and a message M142 that includes the information on the image as the post content. The image forming apparatus 30 acquires the message, and determines the types of the acquired message M140 and the acquired message M142. In the case where the image forming apparatus 30 determines that the type of the message is the output request, the image forming apparatus 30 posts a message M144 that includes the status of the image forming apparatus 30 in the post content.

Another user who belongs to the group posts a message M146 that includes the text data "A3!" as the post content. The image forming apparatus 30 acquires the message, and determines the type of the acquired message M146. In the case where the image forming apparatus 30 determines that the type of the message is the output setting request, on the basis of the request, the image forming apparatus 30 stores the output setting information, and posts a message M148 in which the setting is stored. Meanwhile, the different user from the user who has posted the message M146 posts a message M150 that includes the text data "SMALLER, A4" as the post content. Also, in this case, the image forming apparatus 30 acquires the message, and determines the type of the acquired message M150.

With reference to FIG. 14B, in the case where the image forming apparatus 30 determines that the type of the message is the output setting request, the image forming apparatus 30 posts a message M160 that includes the status of the image forming apparatus 30 in the post content. Just as described, also, even in the case where the different user posts the messages, the image forming apparatus 30 determines the type of the message of each of the messages, and executes the specified processing. In addition, like the message M146 and the message M150 in FIG. 14A, in the case where the message that includes the output setting request related to the paper size is posted, the image forming apparatus 30 only needs to store the output setting information on the basis of the last posted message.

In the case where the output data can be output on the basis of the output setting information, the image forming apparatus 30 posts a message M162 that includes the information on the preview image of the image to be output. In the case where the image forming apparatus 30 posts a message M162 and thereafter a message M164 including the output setting request is posted, the image forming apparatus 30 stores the output setting information again, and posts a message M166 that includes the information on the preview image of the image to be output.

It should be noted that the above-described description is merely one example, and it is needless to say that the above-described description can appropriately be changed. For example, in the present embodiment, the image data is set as the output data. However, the output data may be PDF data, sentence data created by word-processing software, or presentation data created by presentation software.

In the present embodiment, the output condition is stored on the basis of the message posted by the user. However, for example, the output condition may be fixed in advance, and, depending on the user, the output condition may not be able to be set. In this case, the user confirms the status of the image forming apparatus 30, and the posts the image data. In this way, the user can bring the image forming apparatus 30 into the output holding state.

In the present embodiment, description has been made that the output data and the output information are stored in the storage of the image forming apparatus 30. However, the output data and the output information may be stored in the server that manages the image forming apparatus 30. The image forming apparatus 30 may set the number of the output data to the number of the output data that is stored in the server that manages the image forming apparatus 30.

In the present embodiment, since the stored date and time is stored in the output information, the image forming apparatus 30 can calculate an elapsed time since the output holding state. Thus, when a specified time elapses since the output holding state, the image forming apparatus 30 may post a message that urges the output to the group that is identified by the group ID stored in the output information, or may delete the output data and the output information.

In addition, only one type of each of the output data and the output information may be stored per group, or a plurality of types of each of the output data and the output information may be stored per group. In the case where a plurality of types of each of the output data and the output information are stored, the controller 300 may post that the output data that has not been output exists when executing the status posting processing or the output data storage processing, or may be able to select the output data to be output when executing the output processing.

According to the present embodiment, the user can check the status of the image forming apparatus 30 in real time when posting the output request, and thus can determine whether to output the output data on the basis of the status of the image forming apparatus 30. As a result, it is possible to improve usability for the user.

The user can make the output setting via the messenger application. By posting the message that includes the output start request, the user only needs to instruct the image forming apparatus 30 to execute printing and to collect the recording paper as jobs for the image forming apparatus 30. Therefore, it is possible to provide the image forming apparatus 30 with further improved usability.

2. Second Embodiment

Next, a description will be made on a second embodiment. The second embodiment is an embodiment in which, in addition to the processing in the first embodiment the status of the image forming apparatus is sent again when the status of the image forming apparatus is changed. In the present embodiment, FIG. 6 in the first embodiment is replaced with FIG. 15, and FIG. 8 in the first embodiment is replaced FIG. 16. The same functional units and the same processing will be denoted by the same reference numerals, and a description thereon will not be made.

Figure 15:
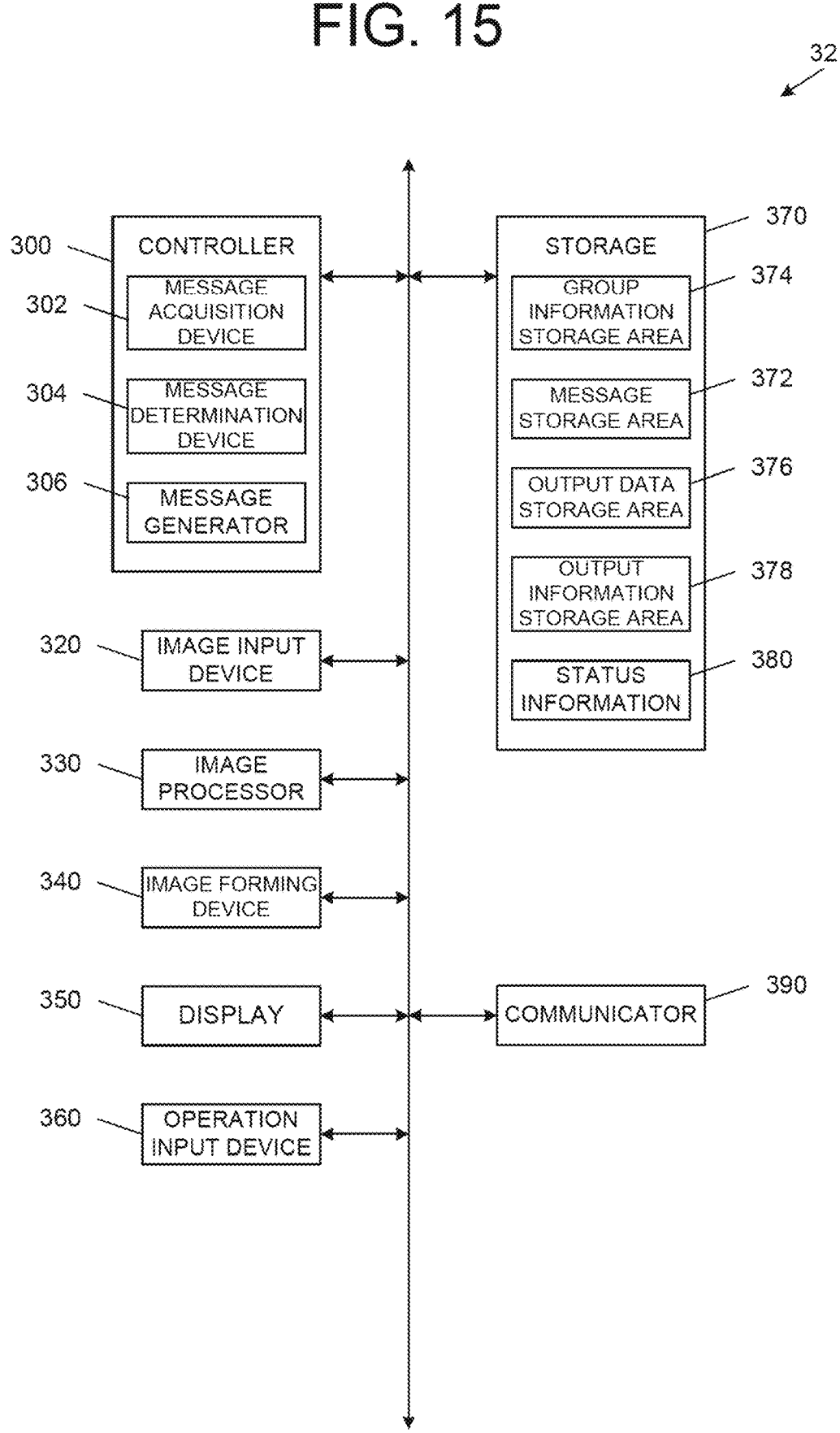
FIG. 15 is a diagram for illustrating a functional configuration of an image forming apparatus in a second embodiment.

A description will be made on a functional configuration of an image forming apparatus 32 in the present embodiment with reference to FIG. 15. As illustrated in FIG. 15, the image forming apparatus 32 differs from the image forming apparatus 30, and the storage 370 differs in a point that the storage 370 further stores status information 380. The status information 380 is information on the status of the image forming apparatus 30, and is, for example, information such as "OPERATION FLAG=1, OUTPUT DATA NUMBER=5".

Figure 16:
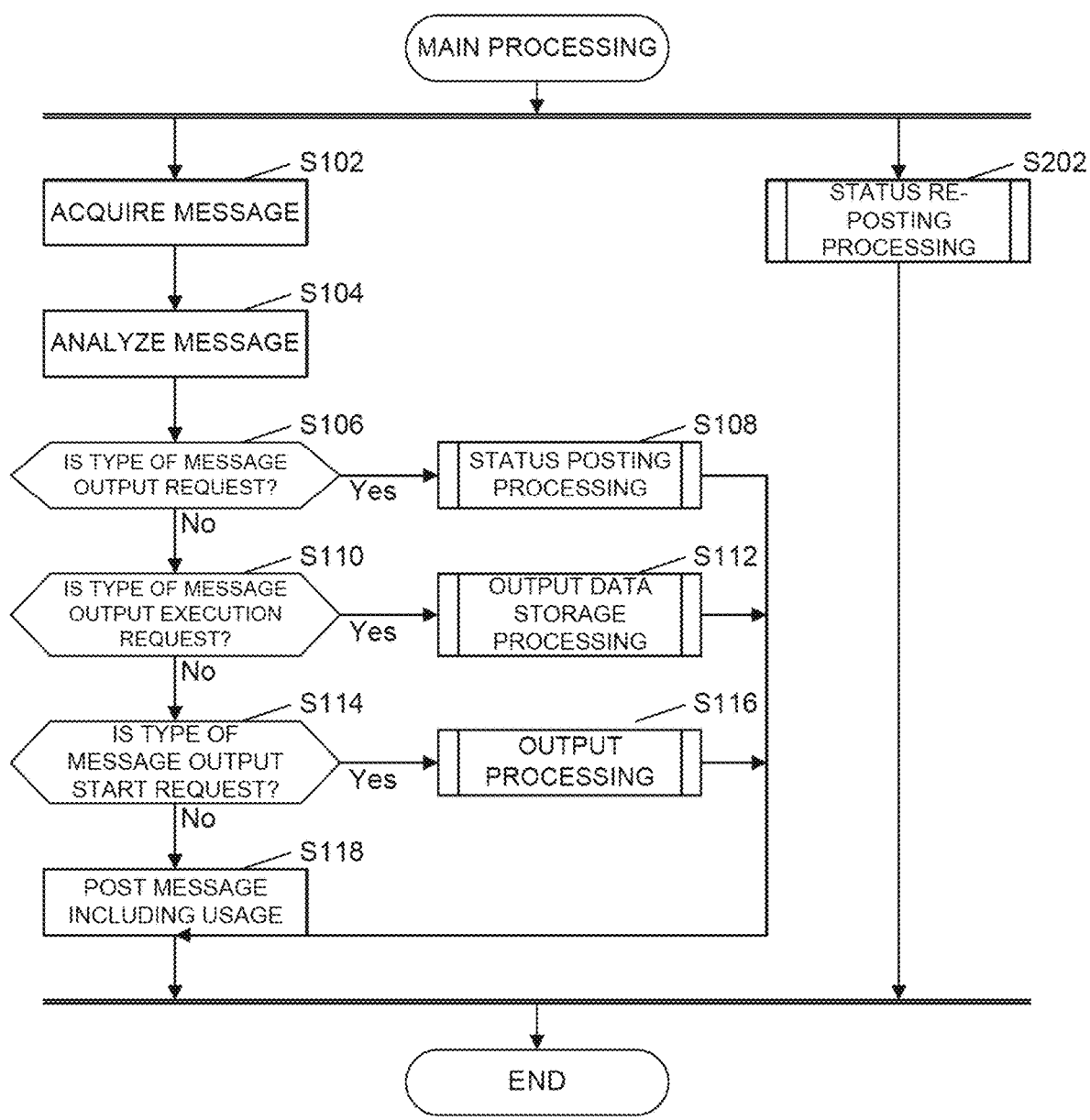
FIG. 16 is a flowchart for illustrating a flow of main processing of the image forming apparatus in the second embodiment.

A description will be made on a flow of main processing by the image forming apparatus 32 in the present embodiment with reference to FIG. 16. The controller 300 in the image forming apparatus 32 executes step S102 to step S118 as the main processing in the first embodiment, and executes status re-posting processing in parallel (step S202). The controller 300 may execute the status re-posting processing periodically or timing at which the operation on the image forming apparatus 30 is started or terminated.

Figure 17:
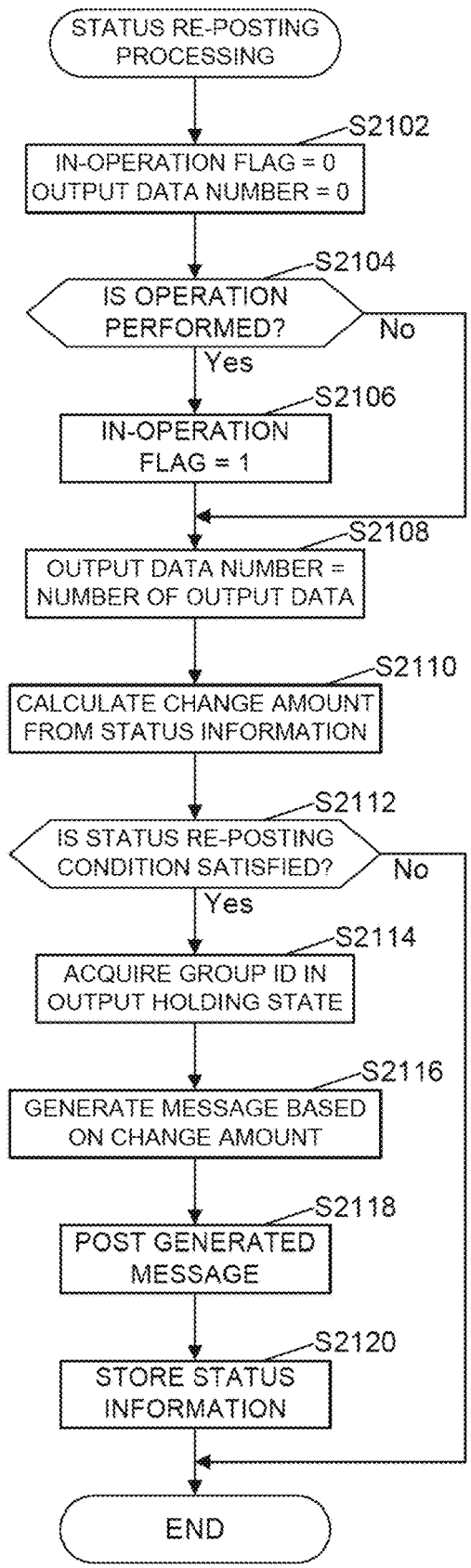
FIG. 17 is a flowchart for illustrating a flow of status re-posting processing in the second embodiment.

A description will be made on a flow of the status re-posting processing with reference to FIG. 17. In the status re-posting processing, first, the controller 300 acquires a current status of the image forming apparatus 32 by similar processing to the status posting processing. That is, the controller 300 assigns "0" to the two variables that are the in-operation flag and the output data number for initialization (step S2102). Next, the controller 300 determines whether the image forming apparatus 32 is operated. If the image forming apparatus 32 is operated, the controller 300 assigns "1" to the in-operation flag (step S2104: Yes→step S2106). The controller 300 assigns the number of the output data stored in the output data storage area to the output data number (step S2108).

Next, the controller 300 compares the status information 380 with the values of the in-operation flag and the output data number, so as to calculate a change amount (a difference) between the status of the image forming apparatus 30 at a time point at which the status information 380 is stored and the status of the image forming apparatus 30 at a time at which the status re-posting processing is executed (step S2110). Then, the controller 300 determines whether the change amount that is calculated in step S2110 satisfies a status re-posting condition (step S2110→step S2112). The status re-posting condition is a condition in which a threshold value of the change amount when the status of the image forming apparatus 32 is posted. For example, as the status re-posting condition, the threshold value of the change amount (the difference) of the output data number is set to "5". In this case, if the difference between the value of the output data number that is stored in the status information 380 and the value of the variable of the output data number is equal to or larger than 5, the controller 300 determines that the status re-posting condition is satisfied. In this way, when the output data number is reduced (congestion is eliminated), or when the output data number is increased (congested), the image forming apparatus 32 posts the status of the image forming apparatus 32. The status re-posting condition may be defined in advance, or may be set by an administrator of the image forting apparatus 32 or the like.

If the status re-posting condition is satisfied, next, the controller 300 acquires the group ID of the group in the output holding state (step S2112; Yes→step S2114). For example, the controller 300 extracts the group ID that is included in the output information stored in the output information storage area 378, and puts the extracted same group ID together. In this way, the controller 300 can acquire the group ID of the group in the output holding state. Next, per group ID of the group in the output holding state, the message generator 306 generates a message that includes a content based on the change amount calculated in step S2110 as the post content (step S2116). For example, the content based on the change amount in the message generator 306 is the text data that indicates a brief status of the congestion (for example, "I AM NO LONGER BUSY", "I AM BECOMING BUSY", or the like).

Next, the controller 300 posts the message that is generated by the message generator 306 to the server device 20 (step S2118). Then, the controller 300 stores the in-operation flag and the value of the output data number as the status information 380 (step S2120).

In the present embodiment, it is determined whether to re-post the status of the image forming apparatus 32 on the basis of the change amount of the status of the image forming apparatus 32 between the time point (time) at which the status information 380 is stored and the time point (time) at which the status re-posting processing is executed. However, the present invention is not limited thereto. For example, it may be determined whether to re-post the status of the image forming apparatus 32 only on the basis of the status of the image forming apparatus 32 at the time when the status re-posting processing is executed. More specifically, when the output data number becomes equal to or smaller than a first threshold value (for example, "3"), the image forming apparatus 32 may post the message indicating that the congestion is eliminated. When the output data number becomes equal to or larger than the first threshold value (for example, "10"), the image forming apparatus 32 may post the message indicating that it becomes congested.

Figure 18:
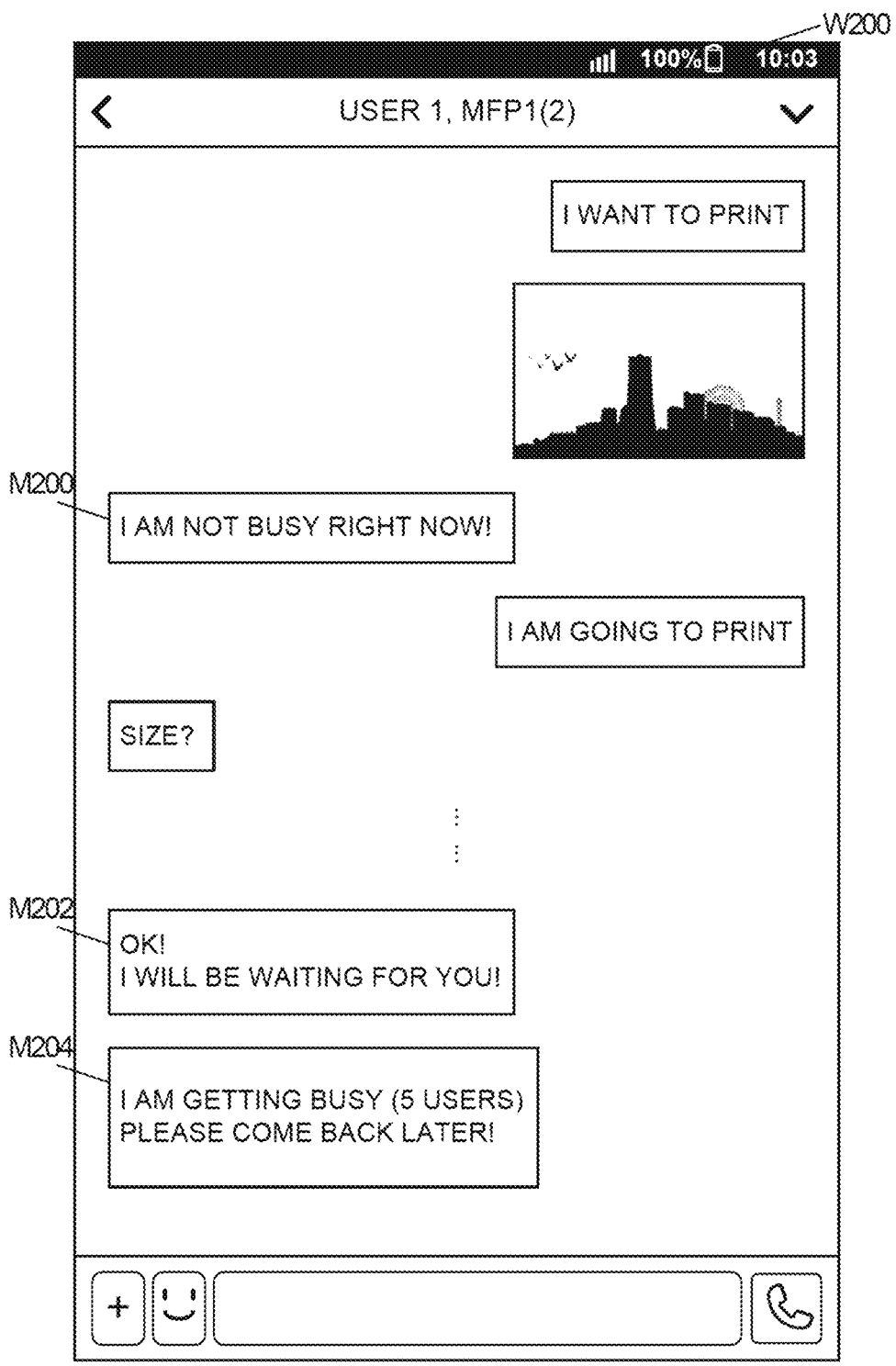
FIG. 18 is a view of an operation example in the second embodiment.

A description will be made on an operation example of the present embodiment with reference to FIG. 18. FIG. 18 is a view of an example of a display screen W200 that is displayed on the display 110 in the case where the image forming apparatus 32 posts a message M200 indicative of the status of the image forming apparatus 32, a message M202 indicating that the image forming apparatus 32 is in the output holding state, and a message M204 indicative of the status of the image forming apparatus 32. As illustrated in FIG. 18, even in the case where the image forming apparatus 32 is in the output holding state, the image forming apparatus 32 can notify the user when the status of the image forming apparatus 32 is changed. Accordingly, when the status of the image forming apparatus 32 is changed, the user can know the status of the image forming apparatus 32 in real time.

According to the present embodiment, the user can know the status of the image forming apparatus 32 according to the change in the status of the image forming apparatus 32. Therefore, the user can easily grasp the status of the image forming apparatus 32 in real time. For example, when the number of the users who use the image forming apparatus 32 used by the user is increased, the image forming apparatus 32 posts the message indicating that user density is increased. Thus, the user can delay timing at which the user heads to the image forming apparatus 32.

3. Third Embodiment

Next, a description will be made on a third embodiment. The third embodiment differs from the first embodiment, and is an embodiment in the case where the plurality of image forming apparatuses 30 belong to the group. In the present embodiment, FIG. 1 in the first embodiment is replaced with FIG. 19, FIG. 8 in the first embodiment is replaced with FIG. 20, and FIG. 10 in the first embodiment is replaced with FIG. 21 and FIG. 22. The same functional units and the same processing will be denoted by the same reference numerals, and the description thereon will not be made.

Figure 19:
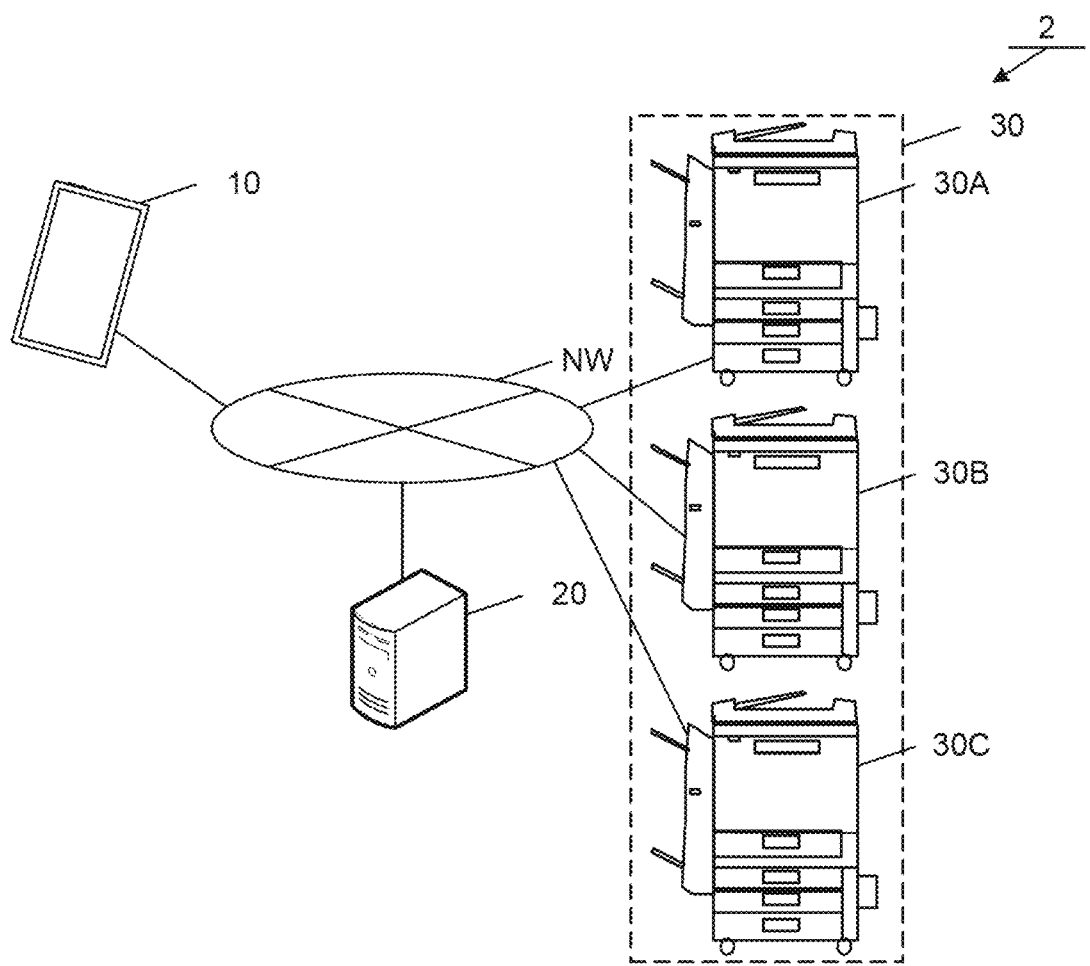
FIG. 19 is a view for illustrating an overall configuration of an output system in a third embodiment.

FIG. 19 is a view of an overall configuration of an output system 2 in the present embodiment. As illustrated in FIG. 19, a description will be made that the three image forming apparatuses 30 (an image forming apparatus 30*a*, an image forming apparatus 30*b*, and an image forming apparatus 30*c*) are connected to the network NW and belong to the same group. The number of the image forming apparatuses 30 that are connected to the network NW may not be three. In the case where the plurality of groups exist, there may be the group to which at least one of the three image forming apparatuses 30 belongs.

The present embodiment differs in a point that, instead of determining whether the type of the message is the output extraction request, the message determination device 304 determines whether the type of the message is a destination designation request.

The destination designation request is a message that requests to designate or change the image forming apparatus 30 (the destination) that outputs the output data. For example, the case where the type of the message is the destination designation request is a case where the post content is the text data that includes a content to identify one of the image forming apparatuses 30 that belong to the group (for example, the account or the user name of the image forming apparatus 30) such as "PRINT BY MFP2".

In the case where the type of the message is the destination designation request, the determination result includes the information that the type of the message is the destination designation request and the information on the image forming apparatus 30 that is designated as the destination (for example, the account and the user name of the image forming apparatus 30). The image forming apparatus 30 determines whether the information on the destination included in the determination result matches information on the image forming apparatus itself. In this way, the image forming apparatus 30 can determine whether the image forming apparatus itself is designated as the destination or the other image forming apparatus 30 is designated as the destination.

In the present embodiment, in the case where the type of the message is the destination designation request and the destination is changed, the output data and the output information are sent from the image forming apparatus 30 that has been designated as the destination so far to the image forming apparatus 30 that is newly designated as the destination.

Figure 20:
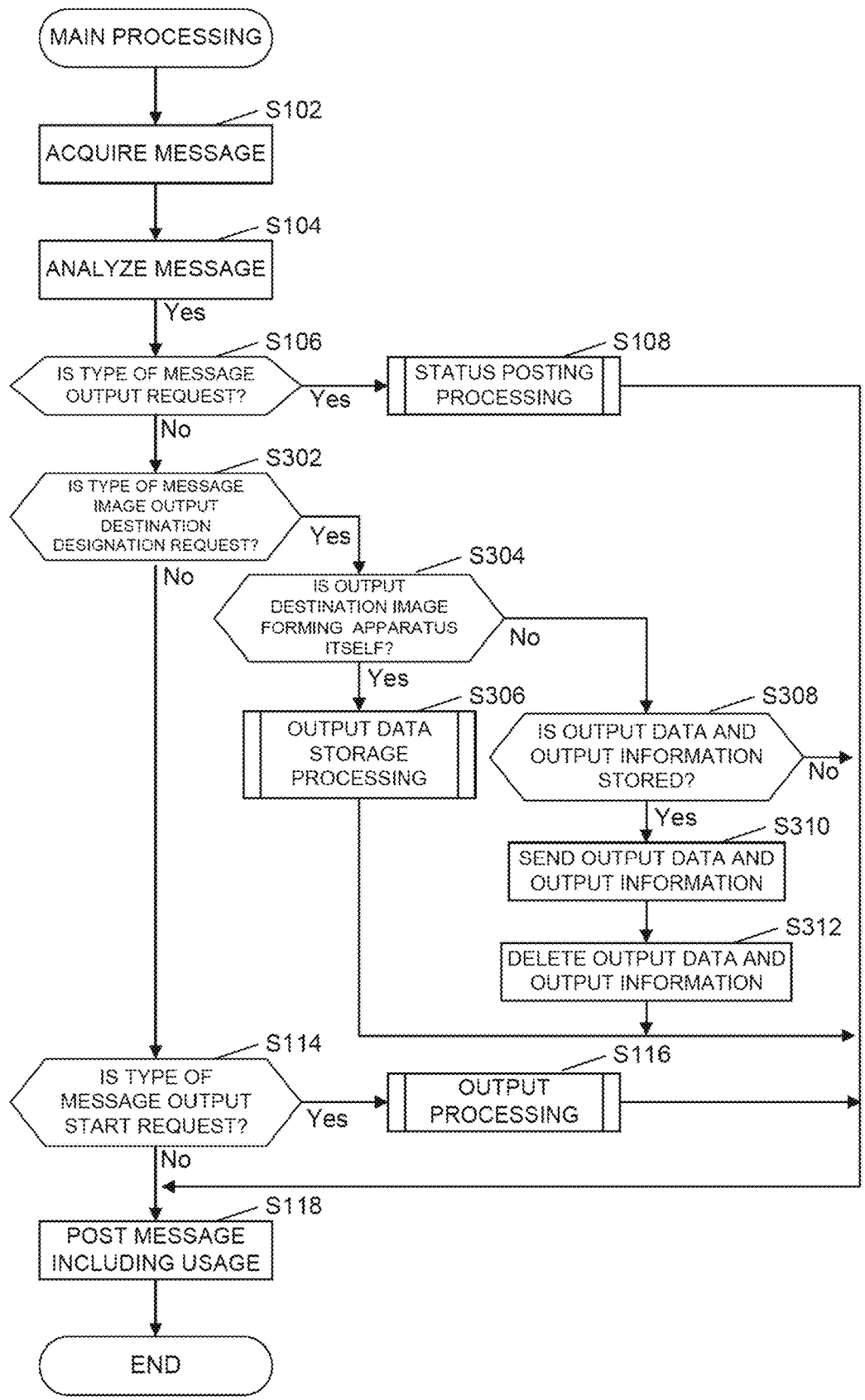
FIG. 20 is a flowchart for illustrating a flow of main processing of an image forming apparatus in the third embodiment.

FIG. 20 illustrates the main processing of the image forming apparatus 30 in the present embodiment. In the present embodiment, in the case where the type of the message is not the output request, the controller 300 determines whether the content of the message included in the determination result is the destination designation request (step S106; No→step S302).

If the type of the message is the destination designation request, next, the controller 300 determines whether the destination of the output data is the image forming apparatus itself (step S302; Yes→step S304). If the destination of the output data is the image forming apparatus itself, the controller 300 executes the output data storage processing (step S304; Yes→step S306). The output data storage processing in the present embodiment will be described later.

In the case where the destination of the output data is the other image forming apparatus 30, the controller 300 determines whether the output data and the output information in the group, which is identified by the destination group ID in the message acquired in step S102, is determined (step S304; No→step S308). More specifically, from the output information stored in the output information storage area 378, the controller 300 extracts the output information having the group ID that matches the destination group ID in the message acquired in step S102. In the case where one or more types of the output information are extracted, the controller 300 determines that the output data and the output information in the group, which is identified by the destination group ID in the message, are stored.

If the output data and the output information are stored, the controller 300 sends the output data and the output information in the group that is identified by the destination group ID in the message acquired in step S102 to the other image forming apparatus 30 that is the destination included in the determination result (step S308: Yes→step S310). Then, the controller 300 deletes the sent output data and the sent output information (step S312).

In the case where the destination of the output data is the other image forming apparatus 30, the controller 300 does not execute the output data storage processing, and ignores posting of the message related to the output data and the output setting. Thus, even in the case where the plurality of image forming apparatuses 30 belong to the group, the image forming apparatus that stores the output data and the output information is the image forming apparatus 30 that is designated as the destination.

Figure 21:
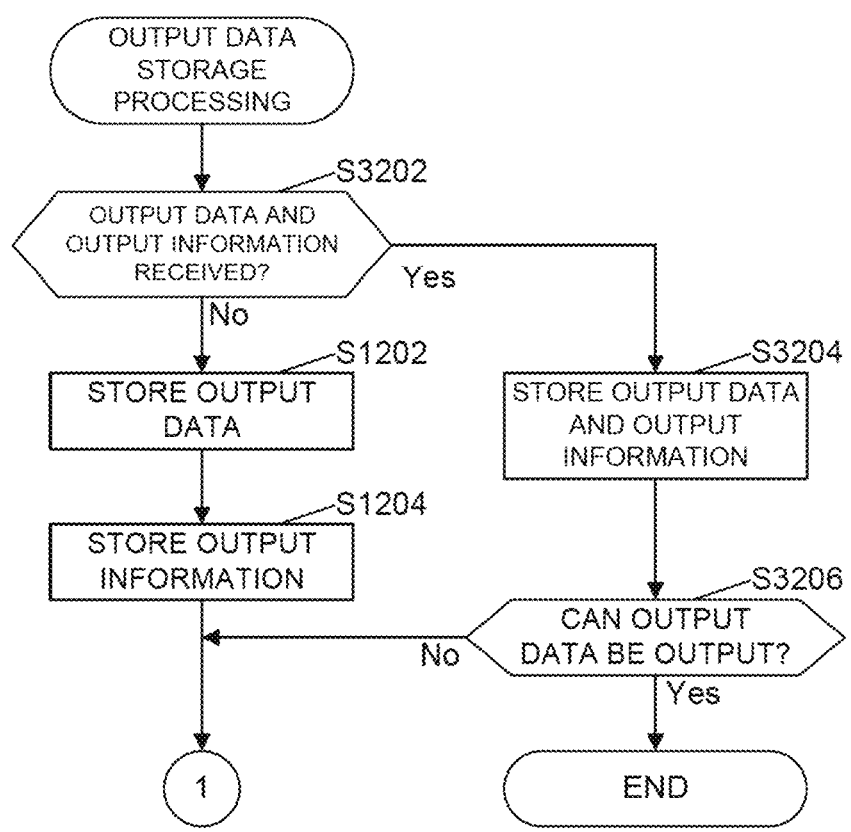
FIG. 21 is a flowchart for illustrating a flow of output data storage processing in the third embodiment.

A description will be made on the output data storage processing in the present embodiment with reference to FIG. 21. First, the controller 300 determines whether the output data and the output information have been received from the other image forming apparatus 30 (step S3202). More specifically, in the case where the other image forming apparatus 30 stores the output data and the output information and the user designates the image forming apparatus itself as the destination, the image forming apparatus itself receives the output data and output information that are sent from the other image forming apparatus 30.

If the output data and the output information are received from the other image forming apparatus 30, the controller 300 stores the received output data and the received output information (step S3202; Yes→step S3204). Next, the controller 300 determines whether the output data can be output on the basis of the stored output data and the stored output information (step S3206). If the output data can be output, the controller 300 terminates the output data storage processing (step S3206; Yes). If the output data cannot be output, the controller 300 executes the processing in step S1206 in FIG. 22 (step S3206; No→step S1206).

Referring to FIG. 22, the controller 300 acquires the message from the server device 20 via the message acquisition device 302, and acquires the determination result of the acquired message via the message determination device 304 (step S1206). Then, the controller 300 determines whether the determination result output from the message determination device 304 is the output setting request (step S1210). If not, the controller 300 determines whether the type of the message is the destination designation quest (step S1210; No→step S3208).

If the type of the message is the destination designation request, next, the controller 300 determines whether the destination of the output data is the other apparatus (step S3208; Yes→step S3210). If the destination of the output data is the other apparatus, the controller 300 sends the output data and the output information to the other image forming apparatus 30 that is designated as the destination (step S3210; Yes→step S3212). Then, the controller 300 deletes the sent output data from the output data storage area 376, and terminates the output data storage processing (step S3214).

As described above, the controller 300 in the image forming apparatus 30 that is not the destination of the output data acquires the message. However, such a controller 300 ignores the content of the message that includes the information on the output data and the output setting request even when the user posts such a message. Meanwhile, in the case where the destination of the output data is changed from the other image forming apparatus 30 to the image forming apparatus itself, the controller 300 receives the output data and the output information that have already been stored in the other image forming apparatus 30, and thus can take over the output data and the output information.

Figure 23A:
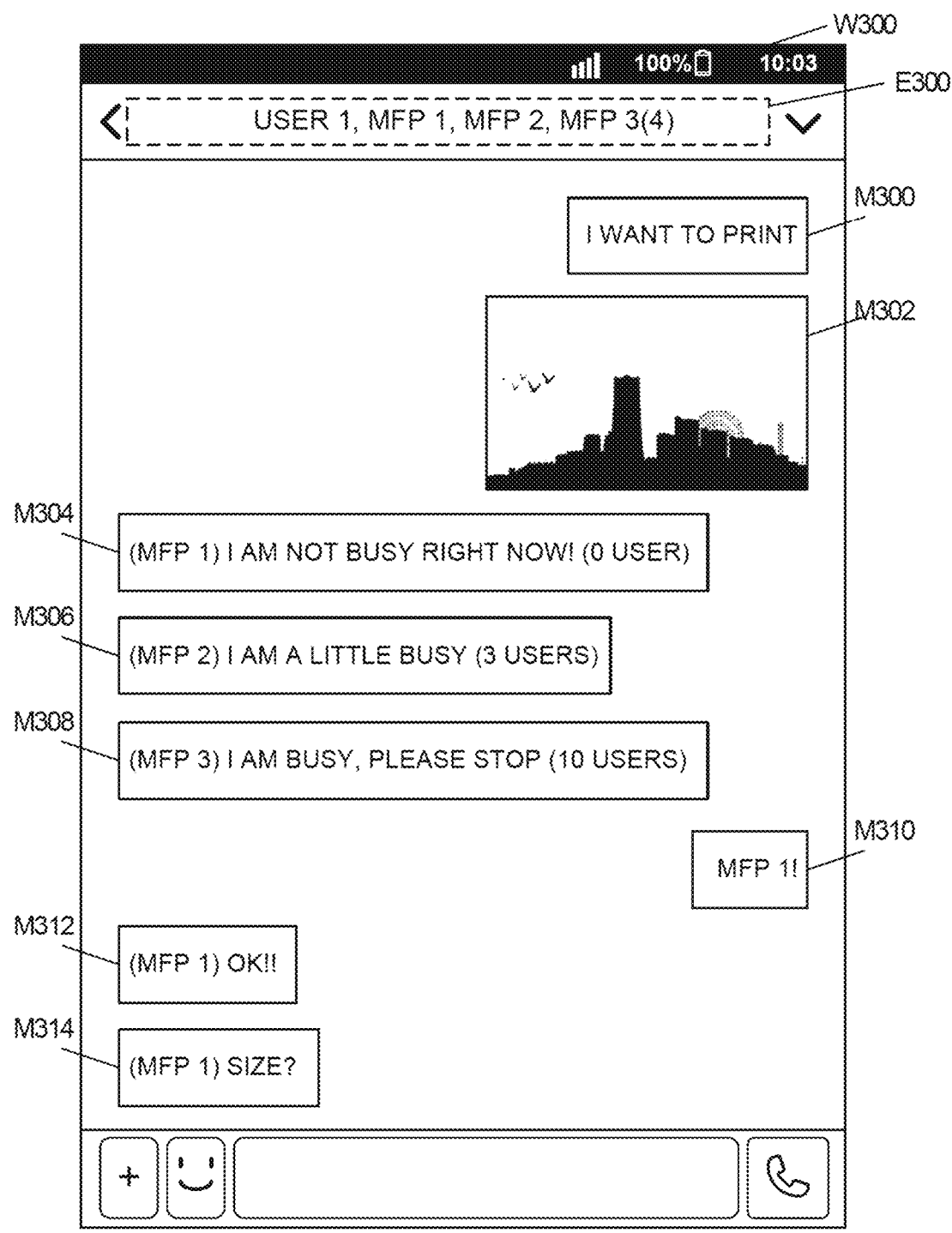
FIGS. 23A and 23B are views of an operation example in the third embodiment.
Figure 23B:
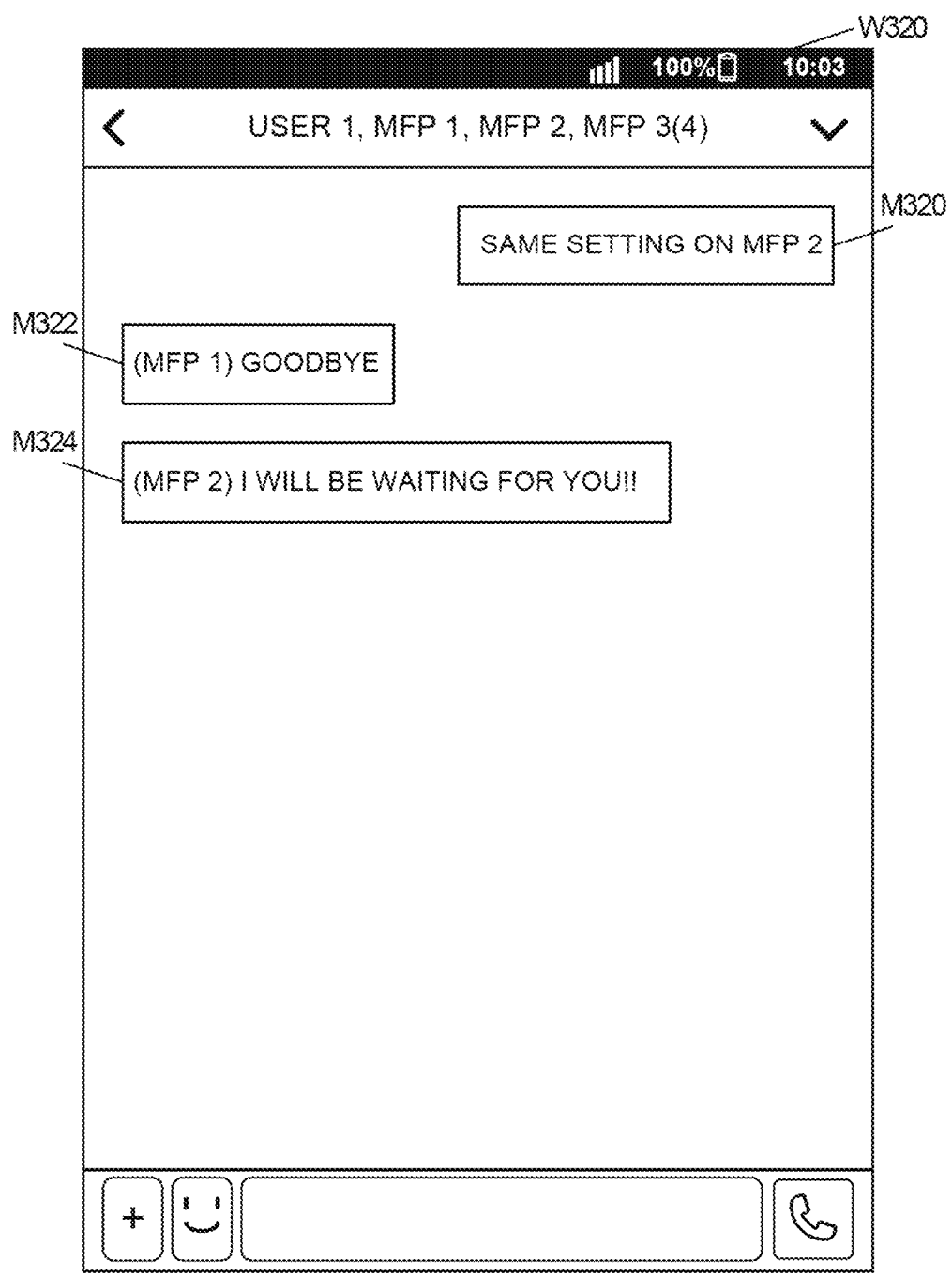

A description will be made on an operation example in the present embodiment with reference to the drawings. FIG. 23A and FIG. 23B are views of examples of display screens W300 and W320 displayed on the display 110 in the case where the controller 100 in the group, to which the plurality of users belong, loads and runs the messenger application 132. Timeline in FIG. 23A and timeline in FIG. 23B continue chronologically.

As illustrated in an area E300, FIG. 23A is a view of an operation example of the group that exchanges one-to-many messages between the user who uses the terminal 10 (the account is "USER 1") and the plurality of image forming apparatuses 30 (the accounts are "MFP1", "MFP2", and "MFP3").

With reference to FIG. 23A, for example, the user who belongs to the group posts a message M300 that includes the text data "I WANT TO PRINT" and a message M302 that includes the information on the image as the post content. Each of the image forming apparatuses 30 that belong to the group acquires the message, and determines the types of the acquired message M300 and the acquired message M302. In the case where it is determined that the type of the message is the output request, each of the image forming apparatuses 30 posts a message that includes the status thereof in the post content. For example, as the message that includes the status of the image forming apparatus 30, MFP1 posts a message M304, MFP2 posts a message M306, and MFP3 posts a message M308.

Next, the user posts a message M310 that includes the text data "MFP1!" in the post content. Each of the image forming apparatuses 30 acquires the message, and determines the type of the acquired message M310. In the case where the type of the message is the destination designation request, the image forming apparatus 30 that is designated as the destination posts a message M312 indicating that the image forming apparatus 30 is designated as the destination. Then, the image forming apparatus 30 that is designated as the destination posts a message M314 that urges posting of the output setting. Just as described, after the user designates the destination, the user and the image forming apparatus 30 that is designated as the destination communicate with each other.

Here, in the case where the user posts a message M320 that includes the output designation request due to convenience of the user or the like, the image forming apparatus 30 that has been designated as the destination so far sends the output data and the output information to the image forming apparatus 30 that is newly designated as the destination. At this time, the image forming apparatus 30 may post a message indicating that the destination has been changed. For example, in the case where the destination is changed from MFP1 to MFP2, MFP1 may post a message M322 indicating that MFP1 is no longer the destination, and MFP2 may post a message M324 indicating that MFP2 is designated as the destination.

Figure 24A:
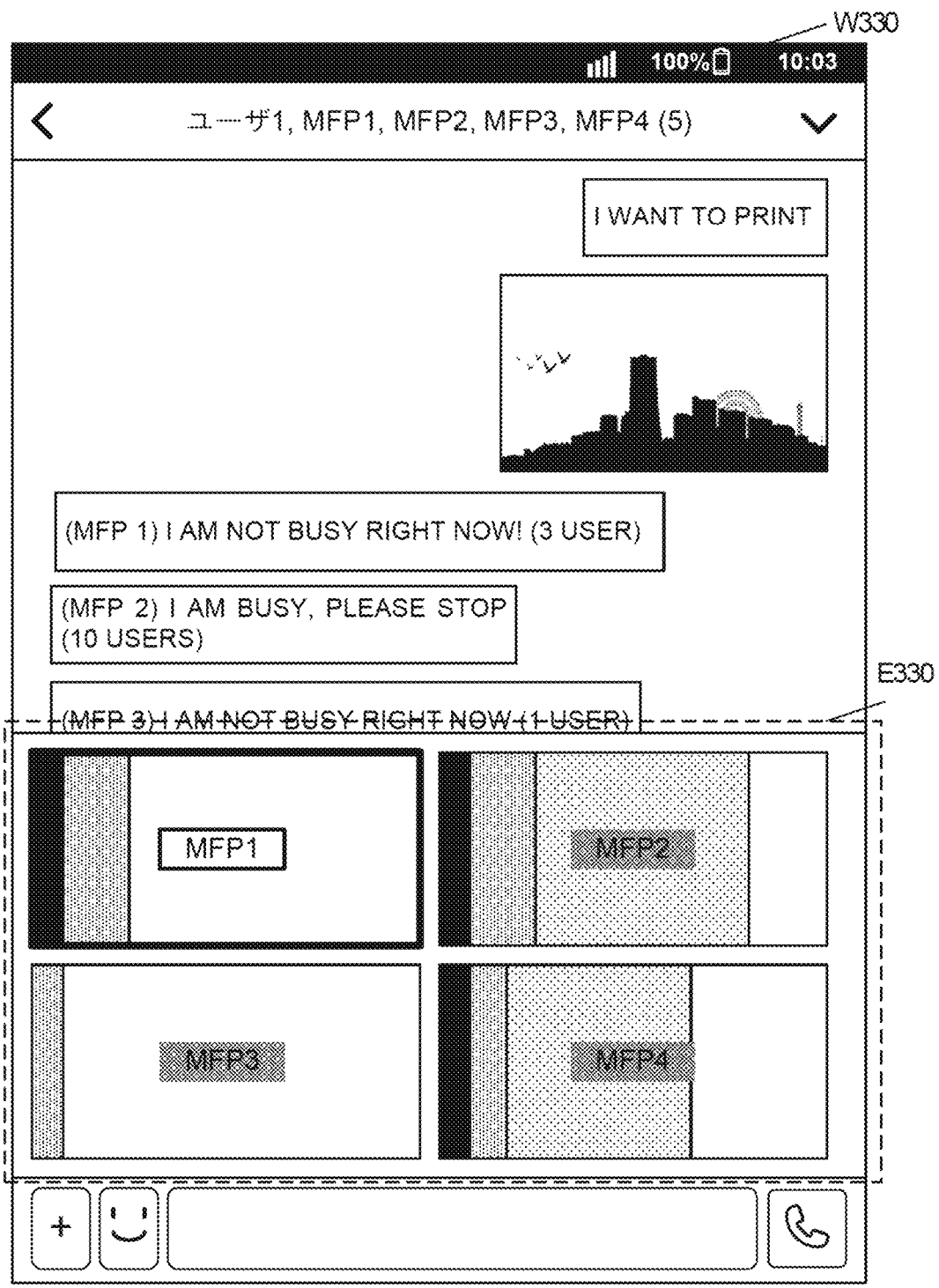
FIGS. 24A and 24B are views of an operation example in the third embodiment.
Figure 24B:
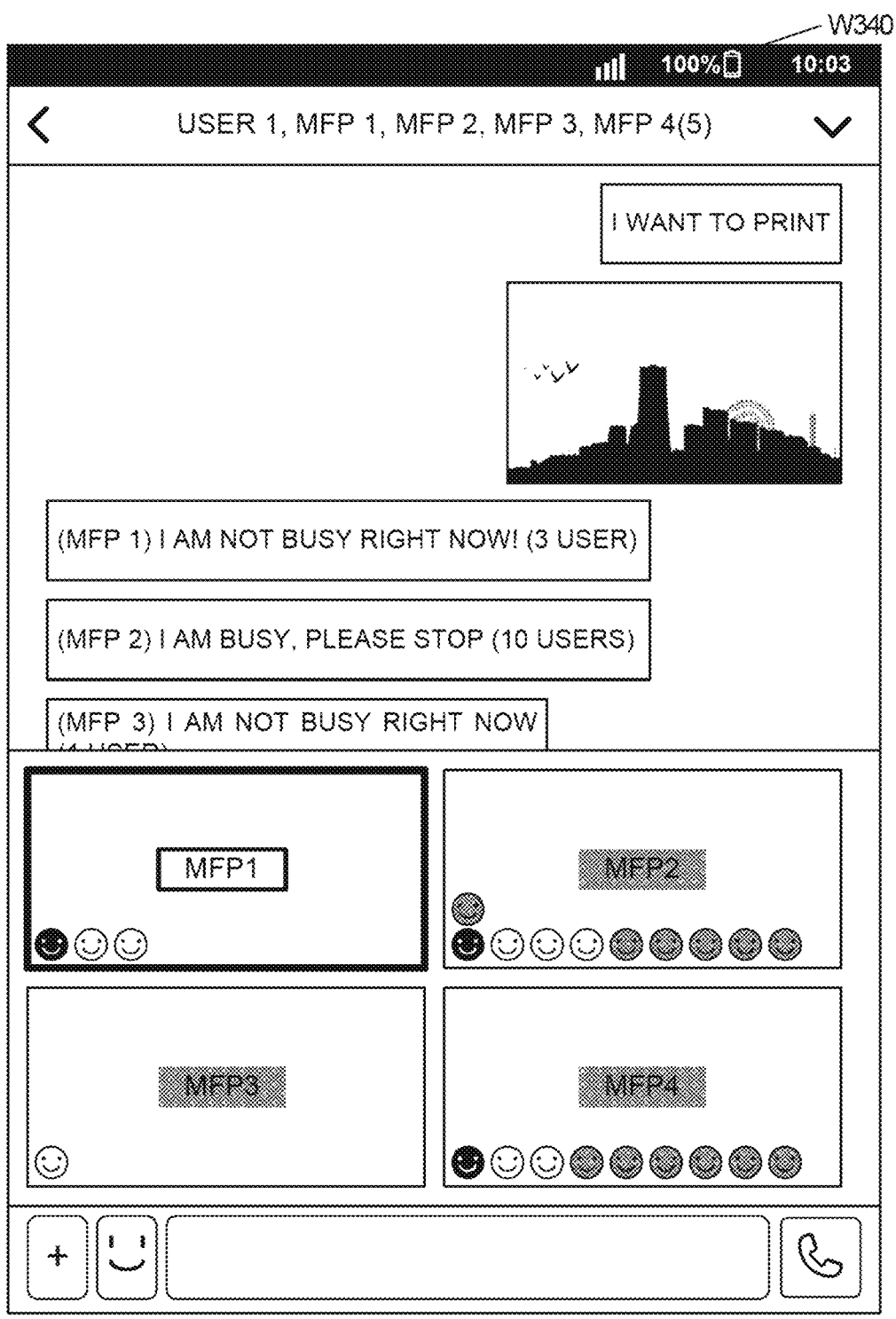
Figure 25:
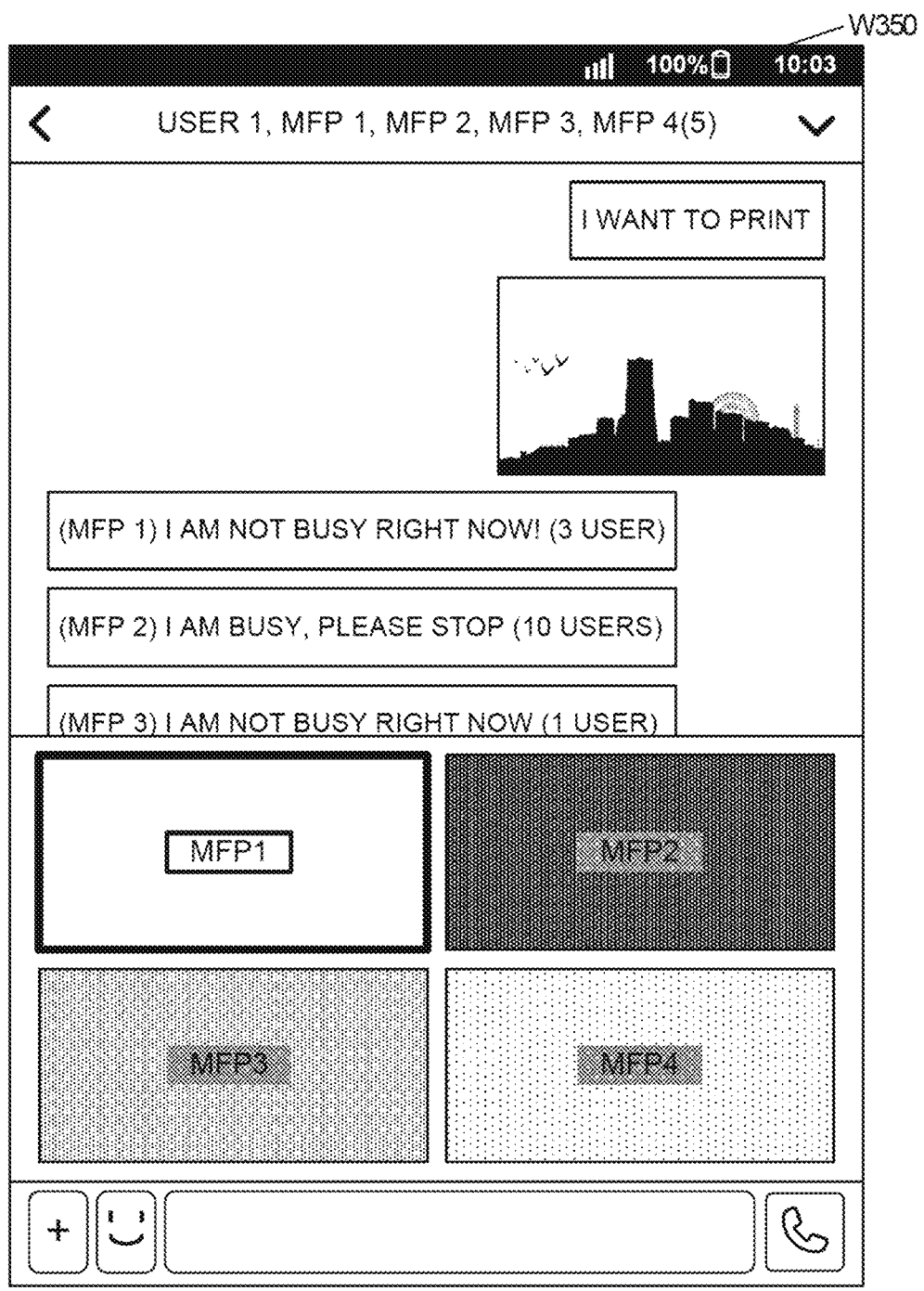
FIG. 25 is a view of an operation example in the third embodiment.

FIGS. 24A and 24B and FIG. 25 include views of examples of a display screen on which buttons used to post the destination designation request are displayed. For example, in a lower portion of a display screen W330 in FIG. 24A, an area E330 is displayed where the buttons that allow selection of a plurality of the image forming apparatuses 30 belonging to the group are arranged.

In the case where the user selects one of the buttons displayed in the area E330, the messenger application 132 helps the user identify the selected button by thickening a frame of the selected button, graying out the non-selected buttons, or the like. In addition, in the case where the user selects the button, a message indicating that the button is selected (for example, a message such as "MFP1 IS SELECTED") may be displayed by the function of the messenger application 132.

In the case where the user selects the button, the messenger application 132 posts the message that includes the destination designation request. In this way, the user can designate the destination of the output data without posting the message that includes the account of the image forming apparatus 30. In addition, in the case where the user selects one of the buttons displayed in the area E330, the terminal 10 and the server device 20 may notify the image forming apparatus 30 that the image forming apparatus 30 has been designated as the destination by a method other than posting. In this way, even in the case where the user unintentionally posts the message that includes the account of the image forming apparatus 30, it is possible to prevent the destination from being changed.

The button displayed in the area E330 may visually indicate the state of the image forming apparatus 30 for each of the image forming apparatuses 30 belonging to the group. The buttons displayed in the area E330 may visually indicate the statuses of the image forming apparatuses 30 for each of the image forming apparatuses 30 that belong to the group. For example, like the display screen W330 in FIG. 24A, the status of each of the image forming apparatuses 30 may be displayed in a graph. The graph indicates whether the image forming apparatus 30 is currently in operation (whether the number of the user who currently operates is 1 or 0), the output data number, and the number of persons near the image forming apparatus 30. The number of persons and the number of the output data can be identified by a color of a band of the graph (for example, a difference in shading or a difference in hue). In addition, the graph may indicate an operation rate based on the number of persons. Various methods for calculating the operation rate are available, and any of the methods can be used as long as information with which an operating situation of the image forming apparatus 30 can be determined from the number of persons and the situation can be present to the user.

It is desired that the graph is updated at specified intervals and thus can display the status of the image forming apparatus 30 in real time as much as possible. For example, each of the image forming apparatuses 30 that belong to the group updates display of the graph by periodically posting and notifying the status of the image forming apparatus 30 to the group. In addition, one of the image forming apparatuses 30 that belong to the group may periodically make an inquiry to the other image forming apparatuses 30 about the statuses, and may post and notify information generated by gathering the statuses of the image forming apparatuses 30 to the group.

As another display example of the buttons, as illustrated in a display screen W340 in FIG. 24B, the number of face icons may represent whether the respective image forming apparatus is currently in operation (whether the user who currently operates is 1 or 0), the output data number (the number of the users waiting for the output), and the number of persons near the image forming apparatus 30. Each of the facial icons may be identifiable by shading of a color. For example, the user who currently operates is indicated by the icon in a dark color, the number of persons near the image forming apparatus 30 is indicated by the icon(s) in a light color, and the user(s) waiting for the output is indicated by the icon in a middle color. The example illustrated in FIG. 24B indicates that the image forming apparatus 30, the account of which is "MFP1" is currently in operation and that the two persons are located nearby. Each of the facial icons may be identifiable by the hue. For example, the user who currently operates may be indicated in red, the number of persons near the image forming apparatus 30 may be indicated in yellow, and the user waiting for the output may be indicated in gray.

As another display example of the buttons, as illustrated in a display screen W350 in FIG. 25, the color of the button may be changed on the basis of the operation rate. For example, the operation rate may be identifiable by shading of the color. When the number of the users is scarce, the color of the button is lightened, and the color of the button is darkened as density of the users is increased. The example illustrated in FIG. 25 indicates that the operation rate of the image forming apparatus 30, the account of which is "MFP1", is the lowest and that the operation rate of the image forming apparatus 30, the account of which is "MFP2", is the highest. The operation rate may be identifiable by the difference in hue. For example, the operation rate may be displayed in red when the density of the users is high, the operation rate may be displayed in yellow when the density of the users is average, the operation rate may be displayed in blue when the density of the users is scarce, and the operation rate may be displayed in gray when no user is present.

In the present invention, the description has been made on the group in which the user who uses the terminal 10 is one. However, the plurality of users who use the terminals 10 may belong to the group. In such a case, the user can designate the image forming apparatus 30 as the destination according to the convenience of the user who collects the output recording paper.

In the present invention, the description has been made that the image forming apparatus 30 directly sends the output data and the output information to the other image forming apparatus 30. However, the image forming apparatus 30 does not have to be configured just as described. For example, the server who manages the plurality of image forming apparatuses 30 is connected to each of the image forming apparatuses 30. In the case where one of the image forming apparatuses 30 receives the message that includes a destination change request, such an image forming apparatus 30 sends the output data and the output information to the server that manages the plurality of image forming apparatuses 30. Then, the server that manages the plurality of image forming apparatuses 30 only needs to send the output data and the output information to the image forming apparatus 30 that is newly designated as the destination.

According to the present embodiment, the user creates the group to which the plurality of image forming apparatuses 30 belong, and posts the message including the output request to the group. In this way, the user can confirm the statuses of the plurality of image forming apparatuses 30. In addition, on the basis of the situations of the image forming apparatuses 30, the user can designate, as the destination, the appropriate image forming apparatus 30 from the plurality of image forming apparatuses 30. Furthermore, even in the case where the image forming apparatus 30 as the destination is changed, the user can proceed with the output processing of the output data in the image forming apparatus 30 that is newly designated as the destination.

4. Fourth Embodiment

Next, a description will be made on a fourth embodiment. The present embodiment is an embodiment in which, in addition to the processing described in the third embodiment, the user is proposed (recommended) to perform the output in the image forming apparatus itself in the case where the other image forming apparatus is in the output holding state and the status of the image forming apparatus itself is changed. In the present embodiment, FIG. 20 in the third embodiment is replaced with FIG. 26. The same functional units and the same processing will be denoted by the same reference numerals, and the description thereon will not be made.

Figure 26:
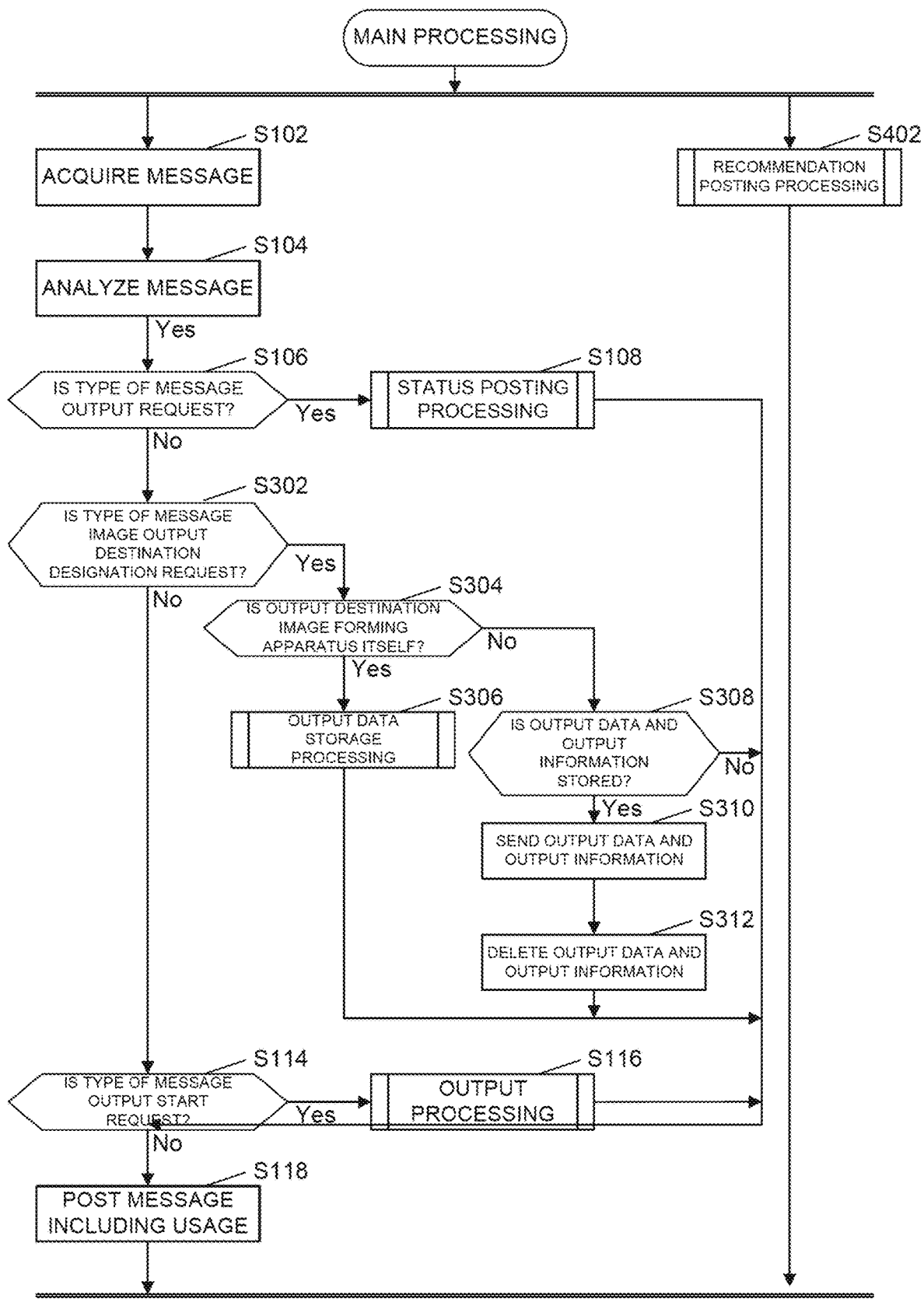
FIG. 26 is a flowchart for illustrating a flow of main processing of an image forming apparatus in a fourth embodiment.

A description will be made on main processing of the image forming apparatus 30 in the present embodiment with reference to FIG. 26. The controller 300 in the image forming apparatus 30 executes step S102 to step S118 as the main processing in the third embodiment, and also executes recommendation posting processing in parallel (step S402).

Figure 27:
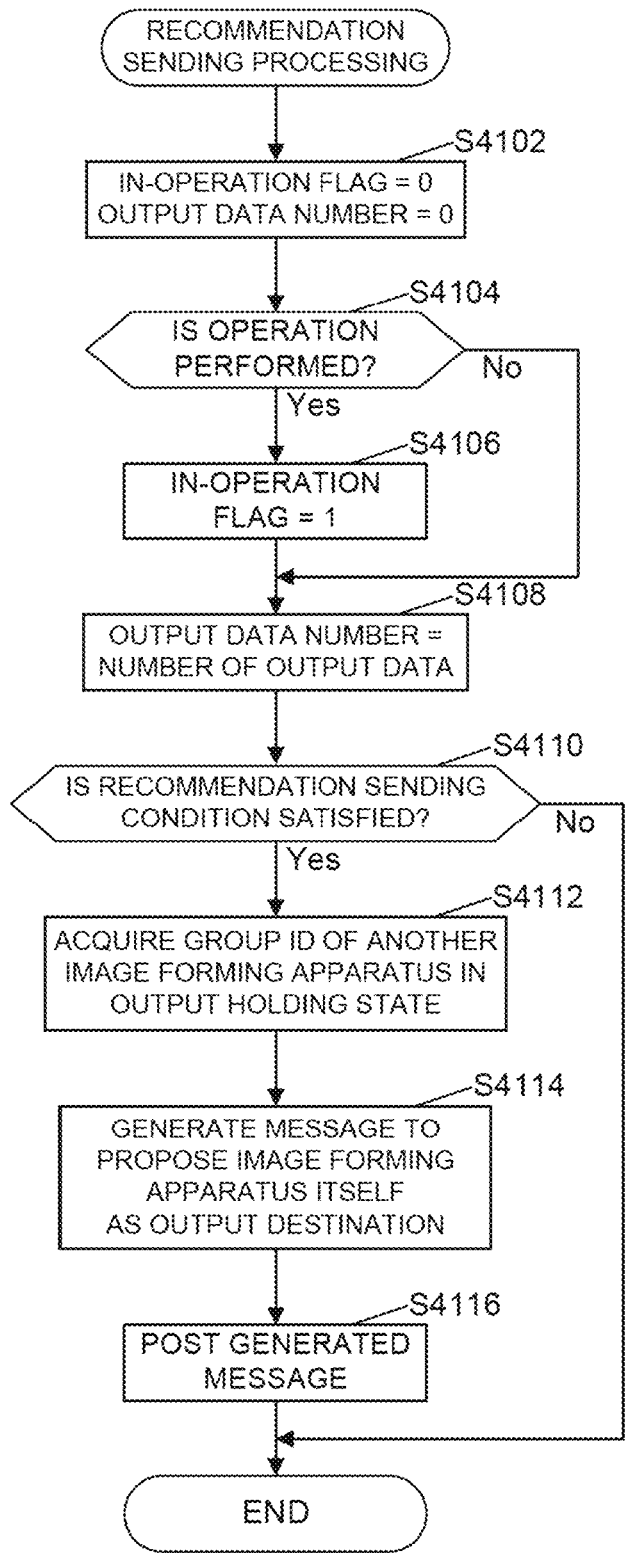
FIG. 27 is a flowchart for illustrating a flow of recommendation sending processing in the fourth embodiment.

A description will be made on the recommendation posting processing with reference to FIG. 27. First, the controller 300 acquires the current status of the image forming apparatus 30. That is, the controller 300 assigns "0" to each of the two variables of the in-operation flag and the output data number for initialization (step S4102). Next, if the image forming apparatus 30 is currently in operation, the controller 300 assigns "1" to the in-operation flag (step S4104; Yes→step S4106). Then, the controller 300 assigns the number of the output data that is stored in the output data storage area 376 to the output data number (step S4108).

Next, the controller 300 determines whether the two variables of the in-operation flag and the output data number satisfy a recommendation sending condition (an output proposal condition) (step S4110). The recommendation sending condition is a condition used when the image forming apparatus itself is proposed as the destination of the output data. For example, as the recommendation sending condition is set such that the in-operation flag is 0 and the output data number is equal to or smaller than 3. As a result, the controller 300 can propose to the user to designate the image forming apparatus itself as the destination in the case where the image forming apparatus itself is not in the output holding state and there is hardly any user who uses the image forming apparatus itself.

If the recommendation sending condition is satisfied, next, the controller 300 acquires the group ID in which the other image forming apparatus 30 is in the output holding state (step S4110; Yes→step S4112). For example, the controller 300 determines whether the other image forming apparatus 30 that belongs to the group is in the output holding state on the basis of the content of the acquired message, or inquires about whether the other image forming apparatus 30 that belongs to the group is in the output holding state.

Next, the controller 300 makes the message generator 306 generate a message, a content of which proposes the image forming apparatus itself as the destination (step S4114). Examples of the content that proposes the image forming apparatus itself as the destination are the text data that urges to designate the destination and the text data indicating that the congestion is eliminated (for example, "I AM NO LONGER BUSY" or the like). Next, the controller 300 posts the message generated by the message generator 306 to the server 20 (step S4116).

Figure 28:
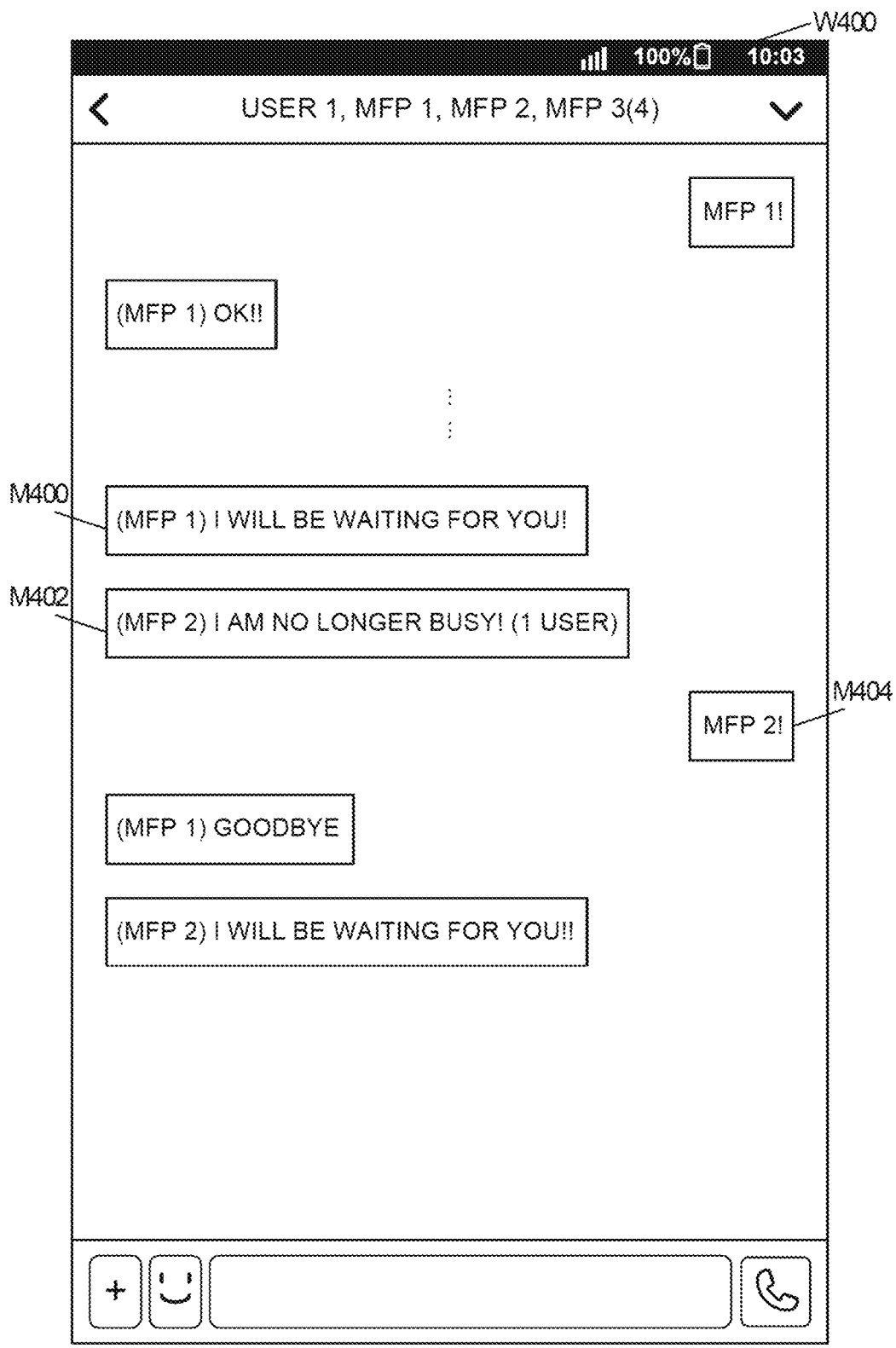
FIG. 28 is a view of an operation example in the fourth embodiment.

A description will be made on an operation example in the present embodiment with reference to FIG. 28. FIG. 28 is a view of an example of a display screen W400 that includes timeline of the group, to which the plurality of image forming apparatuses 30 belong. A message M400 illustrated in FIG. 28 is a message that is posted by one (the account is "MFP1") of the image forming apparatuses 30 belonging to the group and that indicates the output holding state.

A message M402 illustrated in FIG. 28 is a message that is posted by the image forming apparatus 30 (the account is "MFP2") that is not in the output holding state. As illustrated in the message M402, the post content includes the text data indicating that the congestion is getting eliminated. In the case where the user posts a message M404 that includes the destination designation request, the image forming apparatus 30 that has been designated as the destination so far sends the output data and the output information to the image forming apparatus 30 that is newly designated as the destination.

As described above, according to the present embodiment, even in the case where the image forming apparatus 30 is not in the output holding state, the image forming apparatus itself can be proposed to the user as the destination of the output data on the basis of the status of the image forming apparatus 30. In addition, the user can flexibly change the destination according to the status of the image forming apparatus 30. Even in the case of the group to which the plurality of users belong, the user who collects the output recording paper can change the destination by designating the image forming apparatus 30 as the destination or knowing the status of the image forming apparatus 30 in real time.

5. Modified Embodiments

The present invention is not limited to each of the above-described embodiments, and various modifications can be made thereto. That is, an embodiment that can be acquired by combining technical means that are appropriately changed within the scope that does not depart from the gist of the present invention is also included in the technical scope of the present invention.

Furthermore, due to convenience of the description, the above-described embodiments are separately described. However, it is needless to say that the embodiments can be combined and implemented within the scope that is technically possible.

In each of the embodiments, the program that is operated in each of the apparatuses is a program that controls the CPU and the like, so as to implement the functions of each of the above-described embodiments (a program that causes the computer to function). The information handled by these apparatuses is temporarily stored in a temporary storage device (for example, RAM) at the time of processing, is thereafter stored in storage devices such as various types of read only memory (ROM) and the HDD, is read by the CPU when necessary, and is corrected and written.

Here, as a storing medium that stores the program, any of a semiconductor medium (for example, ROM, a non-volatile memory card, or the like), an optical storing medium/magneto-optical storing medium (for example, a digital versatile disc (DVD) a magneto optical disc (MO), mini disc (MD), a compact disc (CD), a Blu-ray Disc (BD)®, or the like), a magnetic storing medium (for example, a magnetic tape, a flexible disk, or the like), and the like may be used. In addition, there is a case where not only the function of each of the above-described embodiments is realized by running the loaded program but the function of the present invention is also realized by cooperative processing with an operation system, another application program, or the like on the basis of an instruction of the program.

In addition, in order to distribute the program in the market, the program can be stored in a portable storing medium for distribution, or the program can be transferred to a server computer that is connected via the network such as the Internet. In this case, it is needless to say that a storage device of the server computer is included in the present invention.

DESCRIPTION OF REFERENCE NUMERALS

1: Output system
10: Terminal
100: Controller
102: Timeline display controller
110: Display
120: Operation input device
130: Storage
132: Messenger application
134: Group information storage area
136: Message storage area
138: Image data storage area
140: Communicator
20: Server device
200: Controller
210: Message receiver
220: Message provider
230: Communicator
240: Storage
242: Group information storage area
244: Message storage area
246: Image data storage area
30: Image forming apparatus
300: Controller
302: Message acquisition device
304: Message determination device
306: Message generator
320: Image input device
330: Image processor
340: Image forming device
350: Display
360: Operation input device
370: Storage
372: Group information storage area
374: Message storage area
376: Output data storage area
378: Output information storage area
380: Status information
390: Communicator

What is claimed is:

1. An image forming apparatus being included in a system with a server that provides messages posted from a plurality of apparatuses to each of the plurality of apparatuses sequentially, and having an image forming device to form an image on a basis of output data, the image forming apparatus comprising:
   a memory that stores instructions; and
   a processor that executes the instructions stored in the memory to:
      acquire a message provided by the server;
      determine a type of the message acquired;
      generate a message on a basis of a status of the image forming apparatus in a case where the type of the message acquired is an output request; and
      post the message generated to the server, wherein:
   a message that is posted to a group to which the image forming apparatus itself and one or a plurality of the other image forming apparatuses belong is acquirable to the image forming apparatus,
   the processor further executes the instruction to determine whether an image output destination is the image forming apparatus itself or the other image forming apparatuses in a case where the type of the message acquired is an image output destination designation request that designates, as the image output destination, an image forming apparatus of a plurality of image forming apparatuses belonging to the group; and
   the image forming apparatus further comprises an output data storage that stores the output data included in the message acquired in a case where the image output destination is the image forming apparatus itself.

2. The image forming apparatus according to claim 1, wherein
   a message that includes information on whether a user who operates the image forming apparatus exists is generated.

3. The image forming apparatus according to claim 1, wherein
   a message that includes the number of the output data that is subject to form an image by the image forming apparatus is generated.

4. The image forming apparatus according to claim 1, wherein
   a message on a basis of the status of the image forming apparatus is generated in a case where a difference between numbers, at two different times, of the output data that is subject to form an image by the image forming apparatus is equal to or larger than a predetermined threshold value.

5. The image forming apparatus according to claim 1 further comprising:
   an output data sender that sends the output data stored in the output data storage to the other image forming apparatus in a case where it is determined that the image output destination is the other image forming apparatus and when the output data is stored in the output data storage.

6. The image forming apparatus according to claim 5, wherein
   a message that proposes to designate the image forming apparatus itself as the image output destination is generated in a case where an output proposal condition is satisfied and where the output data is stored in the other image forming apparatus.

7. A control method for an image forming apparatus being included in a system with a server that provides messages posted from a plurality of apparatuses to each of the plurality of apparatuses sequentially and having an image forming device to form an image on a basis of output data, the control method comprising:
   acquiring a message, said message being posted to a group to which the image forming apparatus itself and one or a plurality of the other image forming apparatuses belong, provided by the server;
   determining a type of the message acquired;
   generating a message on a basis of a status of the image forming apparatus in a case where the type of the message acquired is an output request;
   posting the message generated to the server;
   determining whether an image output destination is the image forming apparatus itself or the other image forming apparatus in a case where the type of the message acquired is an image output destination designation request that designates, as the image output destination, an image forming apparatus of a plurality of image forming apparatuses belonging to the group; and storing the output data included in the message acquired in a case where the image output destination is the image forming apparatus itself.

8. An image forming apparatus being included in a system with a server that provides messages posted from a plurality of apparatuses to each of the plurality of apparatuses sequentially, and having an image forming device to form an image on a basis of output data, the image forming apparatus comprising:

a memory that stores instructions; and a processor that executes the instructions stored in the memory to:

acquire a message provided by the server;

determine a type of the message acquired;

generate a message on a basis of a status of the image forming apparatus in a case where the type of the message acquired is an output request; and post the message generated to the server, wherein a message on a basis of the status of the image forming apparatus is generated in a case where a difference between numbers, at two different times, of the output data that is subject to form an image by the image forming apparatus is equal to or larger than a predetermined threshold value.

* * * * *